United States Patent [19]
Joos

[11] Patent Number: 6,016,291
[45] Date of Patent: Jan. 18, 2000

[54] DATA CARRIER ARCHIVING SYSTEM

[75] Inventor: Karl-Heinz Joos, Gerstetten, Germany

[73] Assignee: Grau GmbH & Co. Holdinggessellschaft, Germany

[21] Appl. No.: 08/954,403

[22] Filed: Oct. 20, 1997

Related U.S. Application Data

[63] Continuation of application No. 08/341,572, filed as application No. PCT/EP94/00925, Mar. 23, 1993, abandoned.

[30] Foreign Application Priority Data

Mar. 23, 1993 [DE] Germany ............................. 43 09 250

[51] Int. Cl.$^7$ .................................................. G11B 17/22
[52] U.S. Cl. .............................................................. 369/36
[58] Field of Search .......................... 369/34, 36; 360/92; 414/266–268, 277, 279, 281, 331

[56] References Cited

U.S. PATENT DOCUMENTS

| | | | |
|---|---|---|---|
| 4,846,619 | 7/1989 | Crabtree et al. | 414/273 |
| 4,907,889 | 3/1990 | Simone | 360/92 |
| 4,932,826 | 6/1990 | Moy et al. | 360/92 |
| 4,984,108 | 1/1991 | Grant et al. | 360/92 |
| 5,303,214 | 4/1994 | Kulakowski et al. | 369/34 |

FOREIGN PATENT DOCUMENTS

| | | |
|---|---|---|
| 0 384 622 | 8/1990 | European Pat. Off. . |
| 0 537 923 | 4/1993 | European Pat. Off. . |
| 0 550 282 | 7/1993 | European Pat. Off. . |
| A-2672417 | 8/1992 | France . |
| WO-A-8606050 | 10/1986 | Germany . |
| 8907753 | 9/1989 | Germany . |
| 38 43 216 | 6/1990 | Germany . |
| WO-A-9007182 | 6/1990 | Germany . |

Primary Examiner—Allen T. Cao
Attorney, Agent, or Firm—Nixon & Vanderhye P.C.

[57] ABSTRACT

An archiving system for data carriers is provided with a storage facility having storage locations for data carriers which includes storage units for respectively storing first and second types of data carrier cassettes, and a read/write facility having a receiver for the data carrier cassettes. The read-write facility includes read/write units for the first and second types of data carrier cassettes, respectively. A handling device for transporting data carrier cassettes from the storage locations to the receiving means and vice versa is provided. Therefore, with the same handling device, both the first type as well as the second type of data carrier cassettes are transportable from their storage locations in the respective storage units to the receiver of the respective read/write units and vice versa.

35 Claims, 21 Drawing Sheets

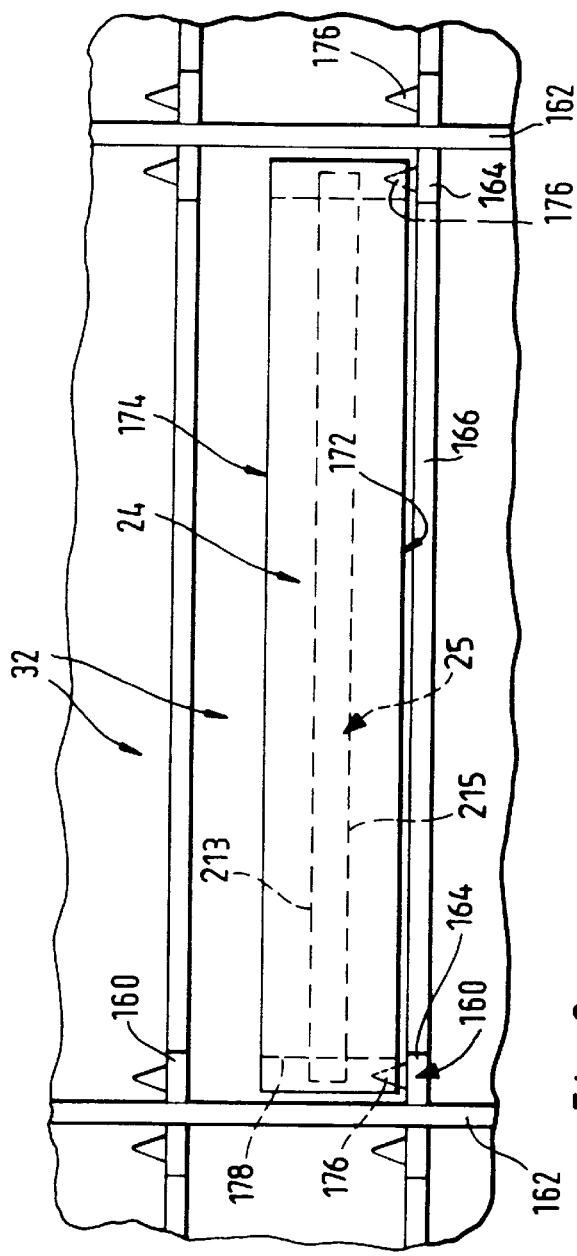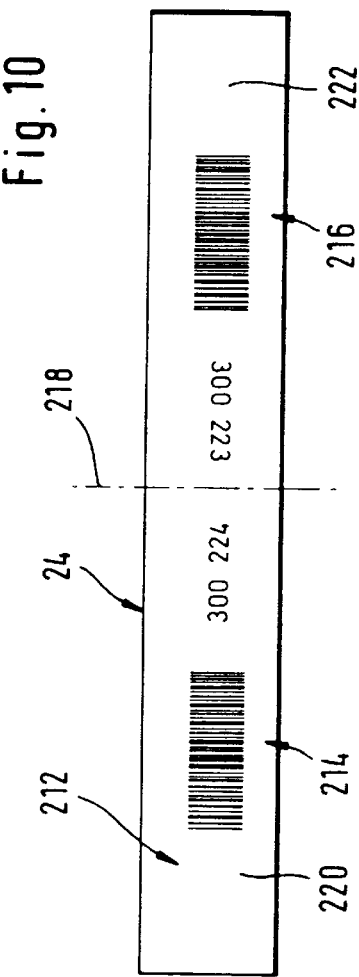

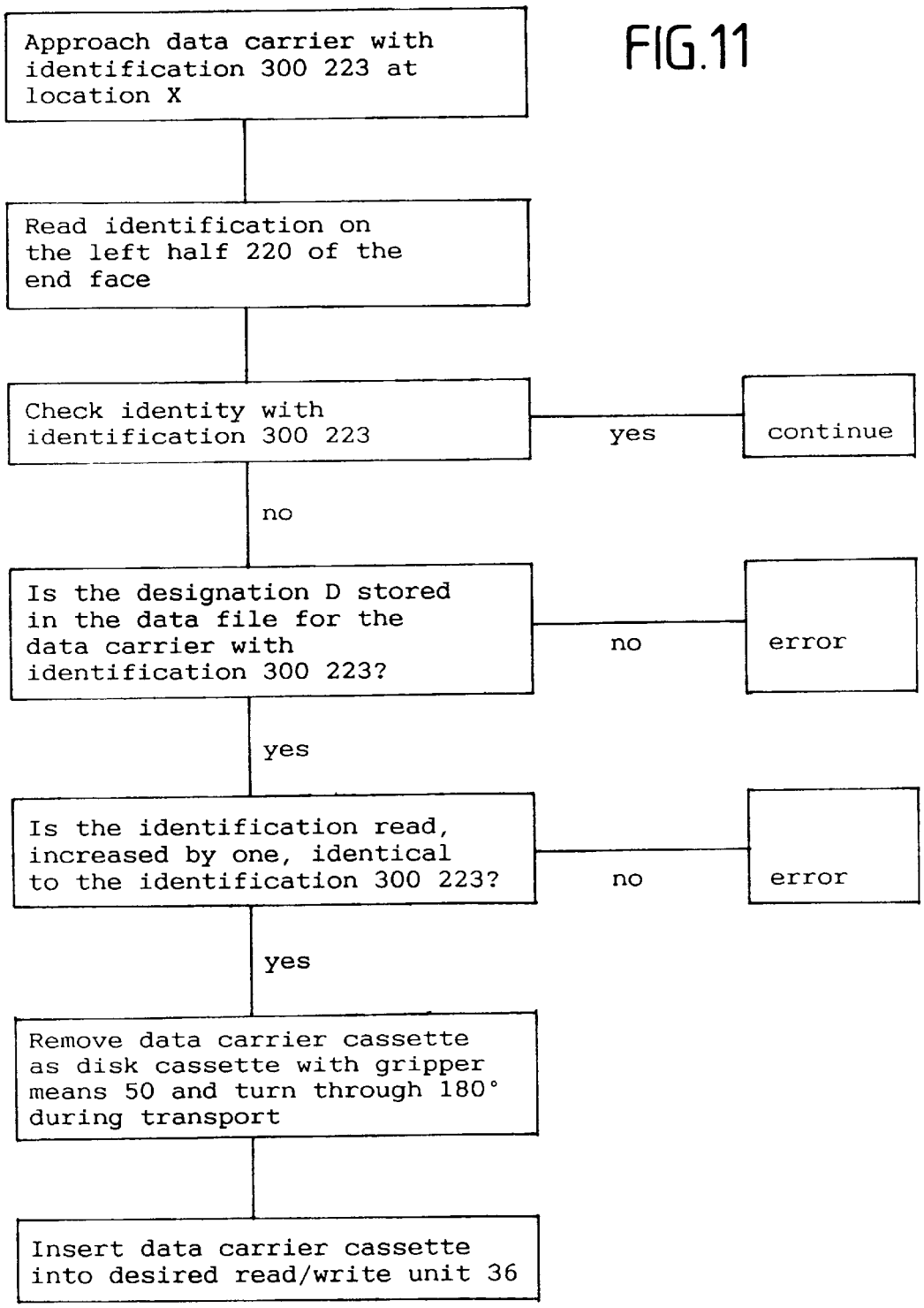

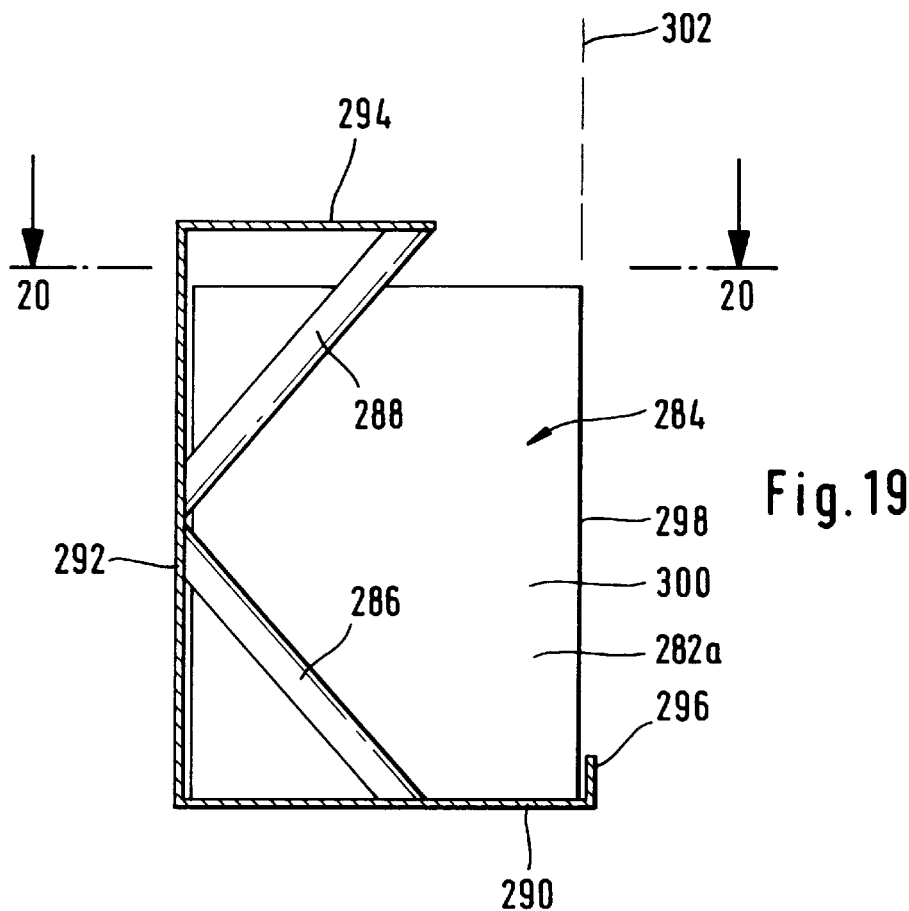
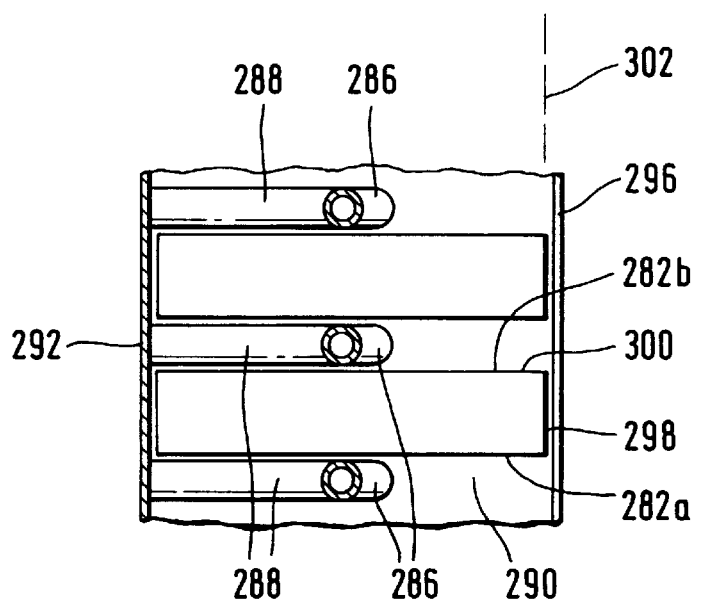

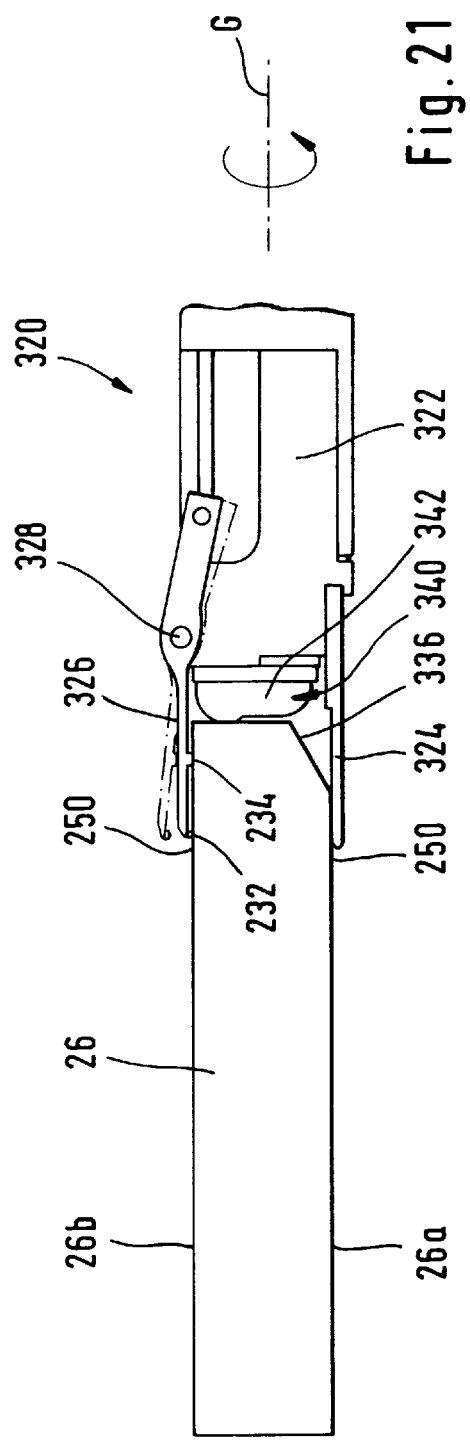
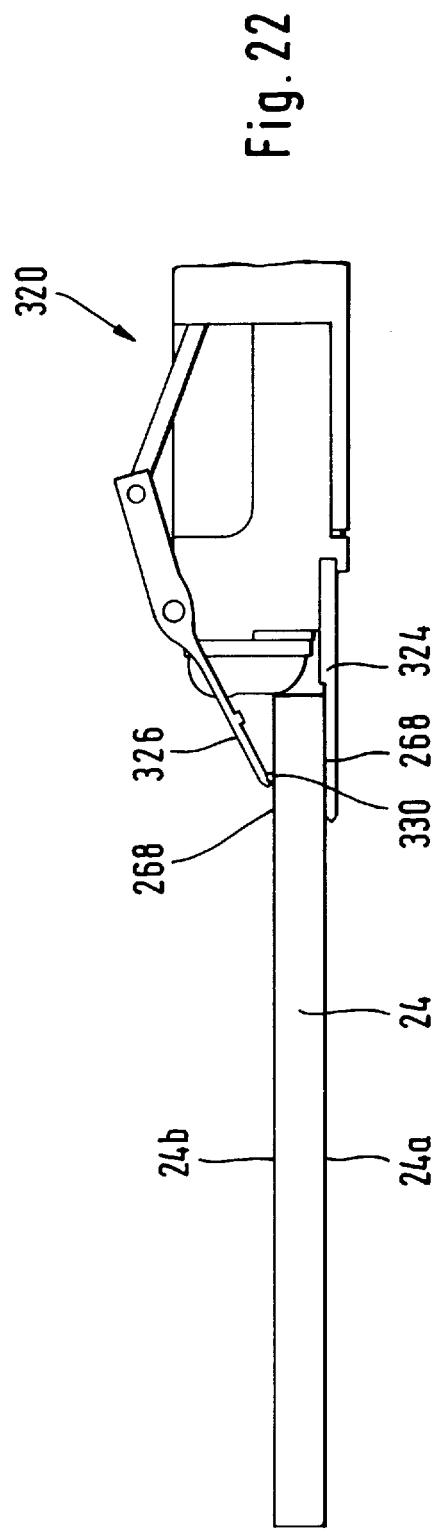

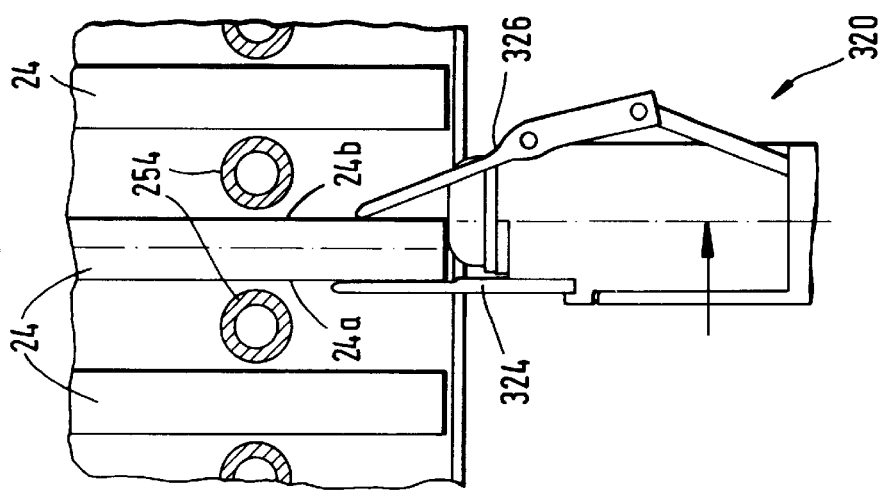
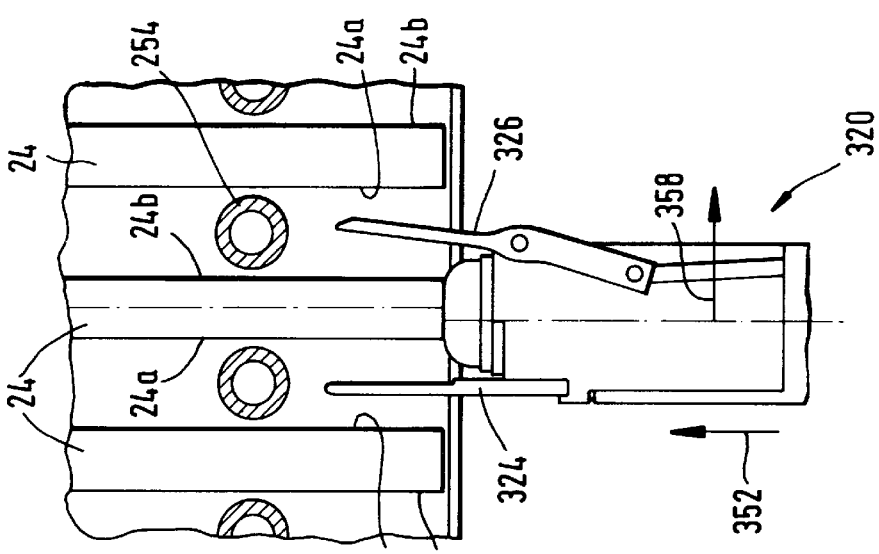
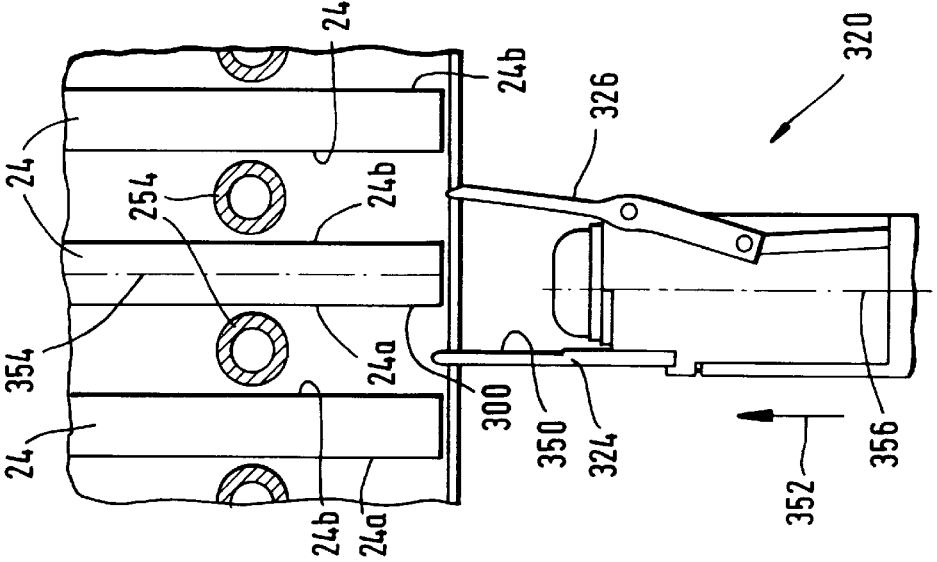

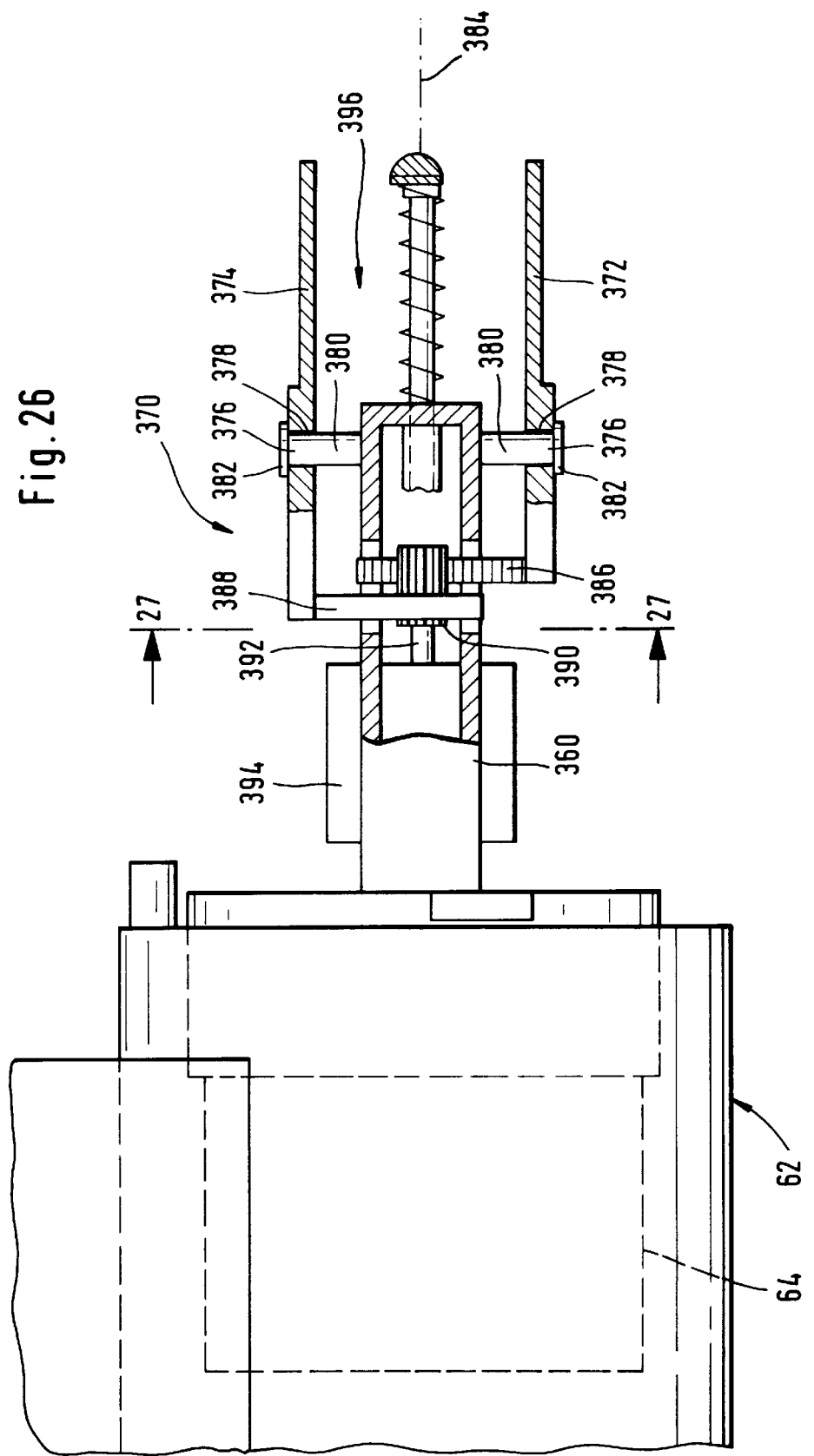

DATA CARRIER ARCHIVING SYSTEM

This application is a continuation of Ser. No. 08/341,572 filed Feb. 13, 1995, now abandoned, which is a PCT/EP9, 400,925 filed Mar. 23, 1993.

The invention relates to an archiving system for data carriers comprising a storage facility having storage locations for data carriers and comprising a storage unit for a first type of data carrier cassettes, for example tape cassettes, a read/write facility having receiving means for the data carrier cassettes and comprising a read/write unit for the first type of data carrier cassettes, and a handling device for transporting the data carrier cassettes from the storage locations to the receiving means and vice versa.

Archiving systems for data carriers of this type, which archive data for mainframe computer systems, are known, for example, from U.S. Pat. No. 5,015,139.

These archiving systems for data carriers are constructed only for one type of data carrier, namely only tape cassettes, and are therefore limited to utilization in cases, in which tape cassettes are used.

The object underlying the invention is to provide a more universal archiving system for data carriers.

This object is accomplished in accordance with the invention, in an archiving system for data carriers of the type specified at the outset, in that the storage facility comprises a storage unit for a second type of data carrier cassettes, that the read/write facility comprises a read/write unit for the second type of data carrier cassettes and that with the same handling device both the first type as well as the second type of data carrier cassettes are transportable from their storage locations in the respective storage units to the receiving means of the respective read/write units and vice versa.

The advantage of the inventive solution is to be seen in the fact that this archiving system for data carriers can be used more universally and, therefore, offers the possibility of using, for example, disk cassettes with storage disks as data carriers. In this respect, a so-called "multimedia operation" of the archiving system for data carriers is possible with the different types of data carrier cassettes and so, for example, either a disk cassette as second type of data carrier or a tape cassette as first type of data carrier is transported by the handling device, as required. It is, however, also conceivable to use different types of tape cassettes or different types of disk cassettes.

It has proven to be particularly advantageous for the transport of the data carrier cassettes when the handling device is provided with a gripper means for the data carrier cassettes since the data carrier cassettes can be removed from the storage locations with this gripper means in a simple manner and inserted into the various receiving means of the read/write facility.

In this respect, one or several gripper means may be used.

In order to grip the tape cassettes and disk cassettes it would, for example, be possible to provide two different gripper means on the handling device and then use one or other of these gripper means depending on the data carrier cassette to be gripped.

It is, however, particularly advantageous for the gripper means to have two gripper fingers and for both the first type of data carrier cassettes as well as the second type of data carrier cassettes to be grippable and transportable with one and the same gripper means. This has the advantage that the control activities are less and the flexibility of the system is greater.

In order to be able to grip the first type (tape cassette) and the second type (disk cassette) securely with one and the same gripper means it is advantageous for a space between the gripper fingers to be adaptable to the shape of the respective data carrier cassette, i.e. in particular to the thickness thereof, for example the thickness of the tape cassettes or the thickness of the disk cassettes, before a data carrier cassette is gripped in the storage facility.

This means that it is possible to design the storage units for the disk cassettes, for example, which are normally thinner than the tape cassettes, to be adapted to the thickness of the disk cassettes and, therefore, to grip all the various types of data carrier cassettes securely and attain a higher storage density per volume in the storage units for disk cassettes.

An adaptation of the space to the different shapes of the data carrier cassettes could take place when gripping the data carrier cassettes during a grabbing movement towards one of these data carrier cassettes in one of the receiving means of the read/write facility.

However, an even more reliable gripping of the data carrier cassettes is ensured in all cases when the space between the gripper fingers is in any case adaptable before the respective data carrier cassette enters the space.

It is particularly advantageous for this adaptation of the space to take place, in general, prior to a last grabbing movement of the gripper means towards the respective data carrier cassette, during which the gripper fingers engage over opposite flat sides of the respective data carrier cassette.

The adaptation of the space could, in principle, take place in the most varied of ways. For example, it is conceivable to use every type of adjusting element for this purpose.

It is, however, particularly favorable for a distance between the two gripper fingers to be adjustable to predeterminable distance values, whereby one of the distance values is provided for the first type of data carrier cassettes and the other of the distance values for the second type of data carrier cassettes.

The adjustment of the two distance values can, for example, take place by means of optional elements, for example by inserting intermediate layers. An adjustment of the predeterminable distance values can be realized particularly simply, from a constructional point of view, when these are determinable by stop elements for the gripper fingers.

In order to be able to carry out the adjustment of the distance values, in particular the changeover from one distance value to the other, as quickly as possible, it is advantageous for the adjustment of the distance values to take place via a sliding movement along a sliding guide means or a pivot movement of the gripper fingers.

In principle, both gripper fingers can be adjustable during the adjustment of the distance between the gripper fingers.

In this case, the gripper means is preferably designed as a synchronous gripper means, the two gripper fingers of which are movable synchronously with one another. This means that the gripper means may always be positioned with its center plane in alignment with the center plane of the data carrier cassettes prior to the grabbing movement and independent of the shape of the data carrier cassettes.

Such a gripper means preferably has a drive which drives the two gripper fingers simultaneously via transmission elements.

The drive is preferably designed as a stepping motor, the driven shaft of which can be definably positioned in optional rotary positions so that it is possible to adjust the space in a simple manner for adaptation to optional shapes of the data carrier cassettes.

It has proven to be particularly advantageous constructionally, due to the simplicity, for one of the gripper fingers to be adjustable relative to the other for adjusting the distance, i.e. the other gripper finger remains stationary during the adjustment of the distance.

In order to provide for conditions which are as defined as possible during grabbing movement towards data carrier cassettes and, in particular, to avoid any subsequent adjustment of the alignment of the gripper means as a whole, it is preferable for the adjustable gripper finger to be adjustable into positions aligned parallel to one another. This has the great advantage that the alignment of the gripper finger does not alter when the setting of the distance is altered and therefore grabbing movement towards the most varied of data carrier cassettes can take place at the same alignment of the gripper means as a whole.

For this purpose, it is particularly expedient for the adjustable gripper finger to be held on a parallel guide means.

In order to be able to hold the respective data carrier cassette securely after insertion into the space, the gripper means has a gripper finger movable from an open position into a closed position, i.e. holding the data carrier cassette securely.

An advantageous solution from a constructional point of view is one, in which the gripper finger movable for firmly holding the data carrier cassette is mounted on the gripper means so as to pivot about an axis.

In principle, the adjustable gripper finger, the adjustment of which takes place, in particular, prior to any gripping of a cassette, could be at the same time the gripper finger movable for firmly holding the data carrier cassette. However, a particularly simple solution from a constructional point of view is one, in which the adjustable gripper finger forms the gripper finger which is stationary during the movement for firmly holding the data carrier cassette and the other gripper finger is the gripper finger movable for firmly holding the data carrier cassette.

In order to ensure an automatic operation of the archiving system for data carriers it is preferable for an adjustment drive to be provided for the adjustable gripper finger and for this to be controllable by a control of the handling system. In addition, a gripper drive controlled by the control is provided for the gripper finger movable for firmly holding the data carrier cassettes.

In a particularly advantageous embodiment, the gripper means has two gripper fingers and the gripper fingers engage over flat sides of the respective data carrier cassette each time in a maximally open position during the grabbing movement and can be brought into a closed position adapted to every shape of the data carrier cassettes for gripping the respective data carrier cassette. This means that a particularly simple gripping construction and control can be realized.

In this case, it is preferable for the data carrier cassettes to be arranged in the respective storage units with flat sides extending transversely to a storage direction and for the data carrier cassettes to be arranged in storage direction at such a distance from one another that the gripper fingers in the maximally open position can be introduced without collision between facing flat sides of next-but-one data carrier cassettes for gripping the data carrier cassette arranged between these flat sides of next-but-one data carrier cassettes so that no problems occur with the nearest adjacent data carrier cassettes during the grabbing movement.

This can preferably be realized in that the data carrier cassettes are held at the defined distance from one another by spacer elements.

This may be favorably accomplished from a constructional point of view when the spacer elements are spacer members arranged between two facing flat sides of consecutive cassettes.

When the data carrier cassettes are stored in the storage elements it is expedient for reasons of reliable gripping for the data carrier cassettes to be held securely in position in the storage units by the spacer members with a small clearance.

The simplest construction for gripping the different data carrier cassettes requires the gripper means to engage over the opposite flat sides of the data carrier cassette located in a storage unit during the grabbing movement with gripper fingers in the maximally open position and to grip the data carrier cassette by movement of the gripper fingers into the closed position.

The simple version of the gripper means provides for the gripper means to have a stationary gripper finger and for the gripper means to engage with this stationary gripper finger over the flat side of the second data carrier cassette to be overlapped in spaced relation thereto during the grabbing movement and during the movement of the movable gripper finger into the closed position to lay the stationary gripper finger against the flat side.

During a grabbing movement towards a first type of data carrier cassette it is possible for the gripper means to engage abuttingly on the flat side to be overlapped with the stationary gripper finger during the grabbing movement and to move the movable gripper finger after the grabbing movement from the maximally open position into the closed position and thereby press the data carrier cassette against the stationary gripper finger.

Alternatively thereto, it is of advantage for the gripper means to be a synchronous gripper means, the two gripper fingers of which are movable and movable essentially synchronously from an open position into the closed position.

In the case of a synchronous gripper means, as well, the simplest case of grabbing movement provides for the gripper means to grab towards the respective data carrier cassette always in the maximally open position of the gripper fingers.

A synchronous gripper means may be realized advantageously when the gripper means has a stepping motor for driving the gripper fingers.

In addition, the grabbing movement towards the different storage units can be simplified when the storage units are designed such that a front side of all the types of data carrier cassettes is located in a plane which has the same distance from the track when the robot is in access position.

In order to be able to utilize data carrier cassettes which can be recorded and read on both sides, in particular to use disk cassettes on both sides, i.e. with both sides of the storage disk as data carrier, it is preferable for the gripper fingers to be rotatable into two end positions turned through 180° relative to one another, whereby in these end positions they hold a data carrier cassette in preferably horizontal alignment.

In order, on the other hand, to be able to also grip and insert into storage locations data carrier cassettes, for example, tape cassettes which are preferably stored in vertical alignment in the storage locations, it is preferable for the gripper fingers to be rotatable from an end position into a position, preferably an intermediate position, turned through 90° in relation to the end positions, whereby in this intermediate position the gripper fingers hold the data carrier cassette in vertical alignment.

In order to determine this intermediate position in as constructionally simple a manner as possible, the intermediate position is preferably definable by a movable stop element.

It is particularly simple from a constructional point of view for the intermediate position to be definable by a rotation-limiting stop.

With respect to the design of the storage facility no further details have been given within the scope of the previous explanations concerning the invention. For an advantageous storage of the data carrier cassettes, for example the tape cassettes but also the disk cassettes, it is, for example, provided for the storage unit for these data carrier cassettes to have as storage locations cassette compartments accommodating these cassettes vertically.

The storage unit is preferably constructed such that it has a plurality of superimposed rows, in which cassette compartments are arranged so as to be located adjacent one another.

In order to prevent the data carrier cassettes from falling out it is preferable for the cassette compartments to have a retaining element for the data carrier cassettes, whereby, for example, the retaining element engages in a recess of the data carrier cassettes or engages over the front side thereof with a nose.

With respect to the design of the storage unit for the disk cassettes, again no details have been given. In an advantageous embodiment, for example, the storage unit for disk cassettes as data carriers has a plurality of storage compartments accommodating the disk cassettes in an essentially horizontal alignment and arranged in stacks above one another, whereby several stacks are preferably arranged next to one another.

In order to be able to grab the disk cassettes lying horizontally in the storage compartments in a simple manner, it is preferable for the storage compartments to have supports for the disk cassettes and for the supports to have a recess for one of the gripper fingers extending from an access side in access direction. This recess offers the possibility of engaging beneath the data carrier cassettes lying on the support in a simple manner.

In the simplest case, the supports comprise two ledges supporting the disk cassettes on opposite sides at their edges.

In order to prevent the disk cassettes falling out of the storage compartments it is preferable for the storage compartments to be provided with a holding element securing the disk cassette from falling out.

The holding element is preferably arranged on the supports.

In the simplest case, the holding element engages in a recess of the disk cassette.

In a particularly advantageous solution, the holding element is formed by a conical projection.

So far, no details have been given with respect to the location at which the holding element is arranged. In an advantageous embodiment, the holding element is arranged on a ledge.

Moreover, it is advantageously provided for the storage compartments to have a rear-side stop for the disk cassette, whereby the rear-side stop is, in the simplest case, formed by a rear wall of the storage compartments.

In a storage unit for disk cassettes it is expediently provided for the storage compartments to be formed by supports for the disk cassettes which are arranged at a constant distance above one another and for the distance between the supports to be greater than the thickness or height of a disk cassette in order to be able to grip the disk cassette without problem.

When a holding element is present, it is expedient for the distance to correspond at least to the height of the disk cassette plus the height of the holding element.

In order to be able to identify the different types of data carrier cassettes in a simple manner, it is preferable for each data carrier cassette to be provided on an end face with an identification.

Since a disk cassette contains a storage disk which can be provided with data on two opposite sides, it is preferable for each disk cassette to be provided with two identifications on the same end face, whereby each identification preferably identifies one respective side of the storage disk.

In order to be able to separate the identifications in a simple manner, it is preferable for the identifications to be arranged on respectively opposite sides of a vertical center line of the end face.

The identifications are preferably arranged symmetrical to the vertical line.

In the simplest case, the identifications are designed as optical identifications, in particular bar codes.

In order to be able to identify the identifications on the data carrier cassettes, an identification system is preferably provided on the handling device next to the gripper means, whereby this system is preferably designed as an optical identification system, in the case of bar codes as identifications as a bar code reading system, and this expediently reads the identification immediately prior to gripping of or during grabbing movement towards the data carrier cassette.

In addition, the invention relates to a process for operating an archiving system for data carriers, comprising a storage element for disk cassettes, a read/write unit for disk cassettes and a handling device with a gripper means rotatable about an axis and a control, wherein, in accordance with the invention, the control recognizes in the case of a disk cassette stored in the storage element to which side of a storage disk in the disk cassette the read/write unit can have access when the disk cassette is inserted in this position, and wherein the control controls the handling device such that in the desired position of the disk cassette gripped by the gripper means this handling device inserts the disk cassette into the read/write unit in this position or in the undesired position of the disk cassette turns the gripper means with the gripped disk cassette through 180° before the disk cassette is inserted into the read/write unit.

The advantage of the inventive process is therefore to be seen in the fact that the read/write units, which are constructed such that they can read only one side of the storage disk in the disk cassette, can be utilized in an optimum manner in conjunction with a double-sided writing or recording of data on the storage disk and, therefore, with an optimum storage density of such an archiving system for data carriers.

In this respect, it is particularly advantageous for the disk cassette to bear an identification on its end face which is read by an identification system carried with the gripper means by the handling device. This identification is preferably an optical identification and the identification system an optical identification system.

In order to be able to carry out an identification of both sides of the storage disk in the case of a disk cassette, it is preferable for the end face of the disk cassette to be provided with two identifications.

In order to prevent any confusion of these identifications by the reading system, it is also preferable for the identifications to be arranged in a defined manner at different locations on the end face such that during reading of one identification only this one is read and no reading of the other identification can automatically take place.

In this respect, it has proven to be particularly expedient for the identifications to be arranged on end face regions of the end face which are located opposite one another.

It is expedient, in particular, in view of the horizontal storage of the disk cassettes for the end face regions bearing the identifications to be arranged on opposite sides of a vertical center line of the end face. This ensures that it is possible to read one of the identifications in a simple manner when approaching the disk cassette by means of the gripper means and simultaneously read one of the identifications by means of the identification system transported along with the gripper means by the handling device.

Due to the arrangement of the identification in the end face regions located opposite one another it is even preferably possible to read the identification by means of the identification system during the course of grabbing movement towards the disk cassette by means of the gripper means and so no separate reading procedure for reading the identification is required but this takes place during the course of grabbing movement towards the disk cassette.

In accordance with the invention, an identification for the data carrier and the location, at which the data carrier is stored in the archiving system for data carriers, are recorded in the case of the archiving system for data carriers in a data file and transmitted each time to the control for carrying out the control commands. In the case of a disk cassette, it would, in principle, be possible to designate the disk cassette as a unit data carrier, to which one location is allocated, and to differentiate each time between different sides of the disk cassette.

During operation of an inventive data carrier system, it has, however, proven to be particularly advantageous, especially with a view to the searching for data and as effective an operation as possible of the archiving system for data carriers, for a separate identification to be allocated to both sides of the storage disk and, therefore, a disk cassette to be listed in the data file as two separate data carriers with different identifications.

In this respect, it is, however, of advantage for reasons of access and the handling of such a disk cassette in the archiving system for data carriers for the two identifications for each side of the storage disk to be correlated with one another.

In an advantageous embodiment, one side of the storage disk is provided with an even number and the other with an uneven number as identification.

In the simplest case, the identifications are chosen such that consecutive whole numbers are used for them.

In order to be able to recognize, during grabbing movement towards a disk cassette, in what position the disk cassette is stored, it would, in principle, be conceivable to read both identifications on both end face regions and determine the position of the disk cassette from the position of the identifications. It is, however, particularly advantageous for only one identification of one end face region to be read during grabbing movement towards a disk cassette and for the position of the disk cassette to be established from this identification via the correlation of the identifications.

Preferably, the position of the disk cassette is established in such a way that the identification is read and either it is recognized as the correct identification or it is recognized that the identification represents the identification correlated with the other side of the storage disk and therefore the handling device is given the command to turn the gripper means with the gripped disk cassette through 180°.

In the case, in which the archiving system for data carriers comprises not only a storage element for one type of data carrier cassettes, for example disk cassettes, but also a storage element for another type of data carrier cassettes, for example tape cassettes, and, in addition, a read/write unit for the respective data carrier cassettes, it is preferable for a designation for the type of the data carrier cassette to be stored in addition in the data file, in which the identification of the data carrier, i.e., for example, either one of the sides of the storage disk or the tape cassette, is stored. This means that on the basis of the designation for the type of data carrier cassette the control of the handling system is in a position to recognize, when approaching the respective data carrier cassettes, whether the cassette is the one type or the other type and, in the case of a disk cassette, to establish the position of the disk cassette as described in the above.

Moreover, the invention relates to a process for operating an archiving system for data carriers, comprising a storage facility, a read/write facility and a handling device as well as a control for the handling device, in particular having one or more of the aforementioned features, in which, according to the invention, the data carriers of the data carrier cassettes are provided with an identification, the identification is stored in a data file and, when there are different types of data carrier cassettes, a designation for the type of data carrier cassette, in which the respective data carrier is arranged, is stored in the data file in addition to the identification. This creates the possibility not only of finding the data carrier in the storage facility at the location which is likewise, for example, stored in the data file but also of simultaneously passing to the control for the handling device the necessary information concerning how the data carrier cassette for the respective data carrier is to be gripped.

This process can then be developed further in a particularly advantageous manner when on the basis of the designation for the type of data carrier cassette the gripper means is adjusted to the respective shape of the data carrier cassette with the control prior to the data carrier cassette being gripped. It is thus possible to carry out a preliminary adjustment of the gripper means to the respective shape of the data carrier cassette prior to any grabbing movement and therefore to grip the data carrier cassette in a space-saving and secure manner.

In a further advantageous embodiment, the gripper fingers are, in accordance with the invention, aligned by the control on the basis of the designation for the type of data carrier cassette and in accordance with the alignment of the data carrier cassette in the storage facility prior to gripping it. With this solution, those cases, in which the one type of data carrier cassettes is stored with vertical alignment and the other type of data carrier cassettes with horizontal alignment, are taken into particular account.

For example, in one embodiment of the archiving system for data carriers the tape cassettes are stored with vertical alignment. In this case, the control is likewise in a position, on the basis of the identification for the data carrier cassette, to align the gripper means either vertically in the case of a tape cassette or horizontally in the case of a disk cassette for access to the respective data carrier cassette while it approaches a data carrier cassette.

In the case of a tape cassette, as well, an identification on an end face of the tape cassette is preferably read at the same time, whereby the end face of the tape cassette bears merely one identification for one data carrier since the tape of the tape cassette is recorded only on one side and therefore the tape cassette is noted in the data file only with the identification for one data carrier.

Additional features and advantages of the invention result from the following description as well as the drawings of one embodiment.

In the drawings,

FIG. 6 is an enlarged end face view of a detail of a storage element for disk cassettes;

FIG. 10 is an end face view of a disk cassette with identifications;

FIG. 11 is a flow chart showing how the position of a disk cassette is determined;

FIG. 19 is a section along line 19—19 in FIG. 18;

FIG. 20 is a section along line 20—20 in FIG. 19;

FIG. 21 is a side view of a gripper means of the second embodiment when gripping a first type of data carrier cassette;

FIG. 22 is a side view similar to FIG. 21 when gripping a second type of data carrier cassette;

FIG. 25 is a schematic illustration of a grabbing movement for the second type of data carrier cassette where FIG. 25a shows the alignment of the gripper means prior to the grabbing movement FIG. 25b shows the grabbing movement FIG. 25c shows the gripper means and the transverse movement of the gripper means;

FIG. 26 is a side view of a third embodiment of the gripper means and

Figure 1:
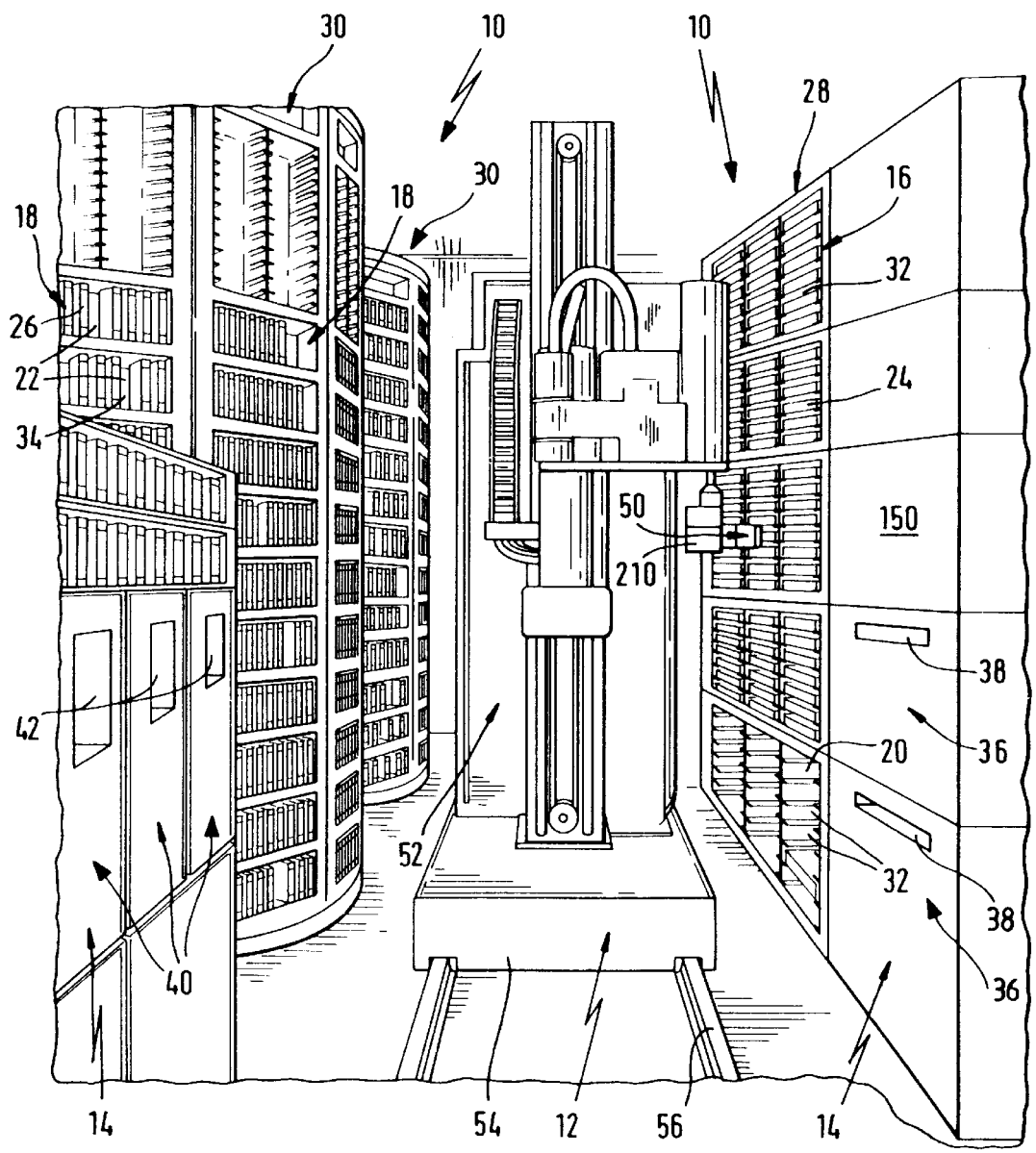
FIG. 1 is a perspective view of a first embodiment of an inventive archiving system for data carriers.

A first embodiment of an inventive archiving system for data carriers comprises a storage facility 10, a handling device 12 and a read/write facility 14.

The storage facility 10 is constructed of storage units 16 (second storage units) and 18 (first storage units), which have storage locations 20 and 22, respectively, for data carrier cassettes 24 and 26, respectively. These storage units 16 and 18 are arranged either in storage shelves 28 or revolving storage towers 30.

The data carrier cassettes 24 are, for example, disk cassettes forming second data carrier cassettes which are stored in horizontal alignment in disk compartments 32 serving as storage location 20. Furthermore, the data carrier cassettes 26 are tape cassettes forming a first type of data carrier cassettes which are preferably arranged in vertical alignment in tape compartments 34 forming the storage locations 22.

In addition, the read/write facility 14 comprises on the one hand read/write units 36 for the tape cassettes 24 which each have an input/output compartment 38 for the disk cassettes 24. In addition, the read/write facility 14 comprises read/write units 40 for tape cassettes which, for their part, likewise have an input/output compartment 42 for the tape cassettes.

Both the disk cassettes 24 and the tape cassettes 26 are transported by one and the same handling device 12 which has a gripper means 50 which, for its part, is movable in the room by means of a six-axis robot 52 designated as a whole as 52. In addition, the robot 52 is seated on a carriage 54 which, for its part, is movable along a track 56 which extends alongside the storage shelves 28 and the revolving storage towers 30 as well as the read/write units 36 and 40.

The gripper means 50 comprises, as illustrated in FIGS. 2 to 5, a housing 60 which is mounted on a support for the gripper means designated as a whole as 62 for rotation about an axis G. For this purpose, a rotary drive 64 is arranged in the support 62 and the housing 60 is connected thereto with a rearward housing section 66 having a circular-cylindrical outer surface.

The gripper means 50 has, for its part, a first movable gripper finger 70 and a second adjustable gripper finger 72, between which a space 74 for accommodating a cassette is located. The two gripper fingers 70 and 72 extend away from the housing 60 essentially in the direction of the axis G on a front side located opposite the rearward housing 66.

Figure 2:
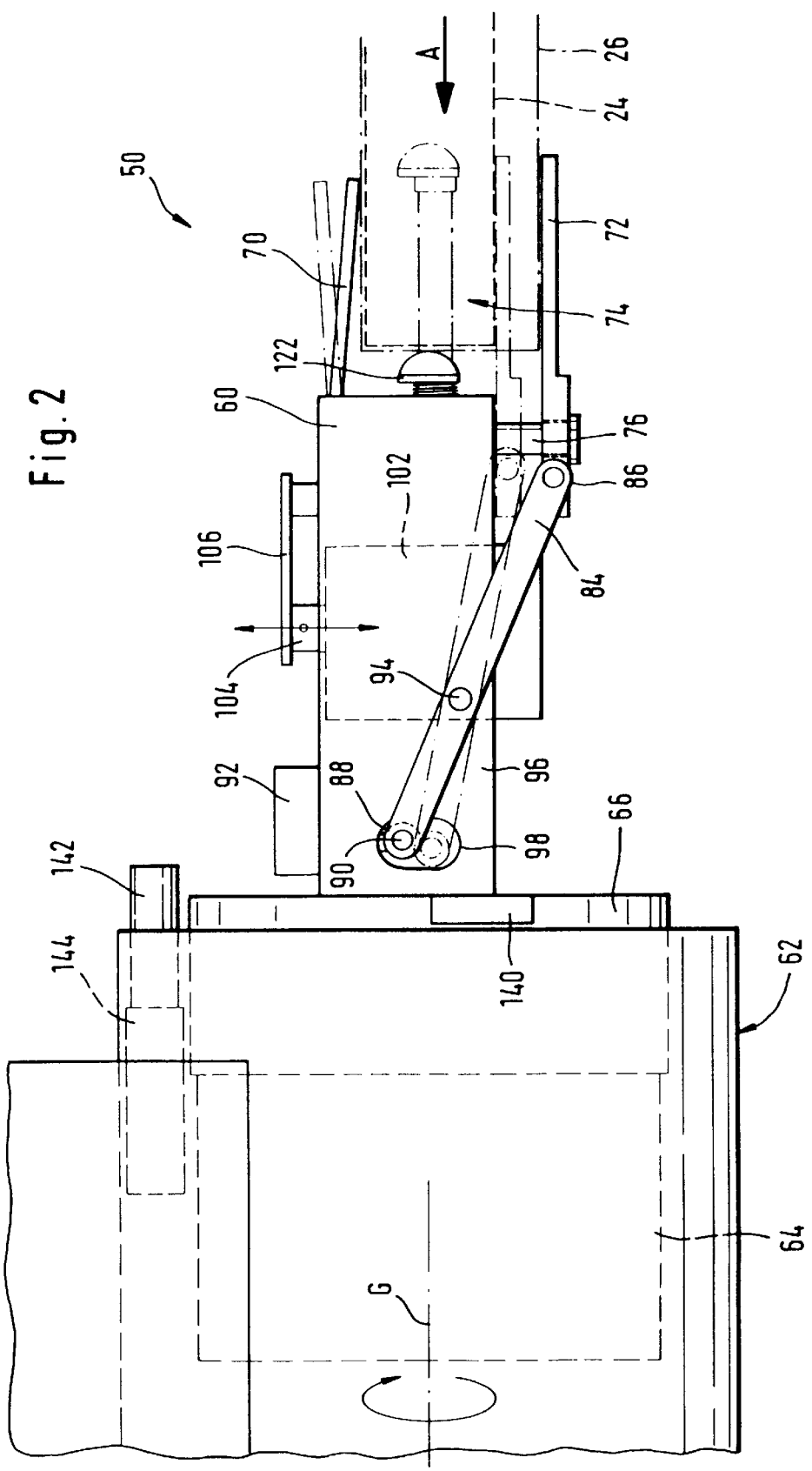
FIG. 2 is a side view—in the direction of arrow B in FIG. 3—onto a gripper means for the inventive archiving system for data carriers.

Either a front section of a tape cassette to be gripped, illustrated in FIG. 2 by a dash-dot line, or a disk cassette 24 to be gripped, illustrated in FIG. 2 by a broken line, can be inserted into the space 74, whereby for gripping the gripper fingers 70, 72 engage over opposite flat sides 24a, b or 26a, b of the data carrier cassettes 24, 26 in their open position (dash-dot line) and then transfer into their closed position.

Since the two data carrier cassettes 26 and 24 have a different thickness, the second adjustable gripper finger 72 is adjustable into two positions, namely a tape cassette position, illustrated by solid lines in FIG. 2, and a disk cassette position, illustrated by a dash-dot line in FIG. 2. In the tape cassette position, the distance between the second gripper finger 72 and the first gripper finger 70 is greater than in the disk cassette position.

Figure 3:
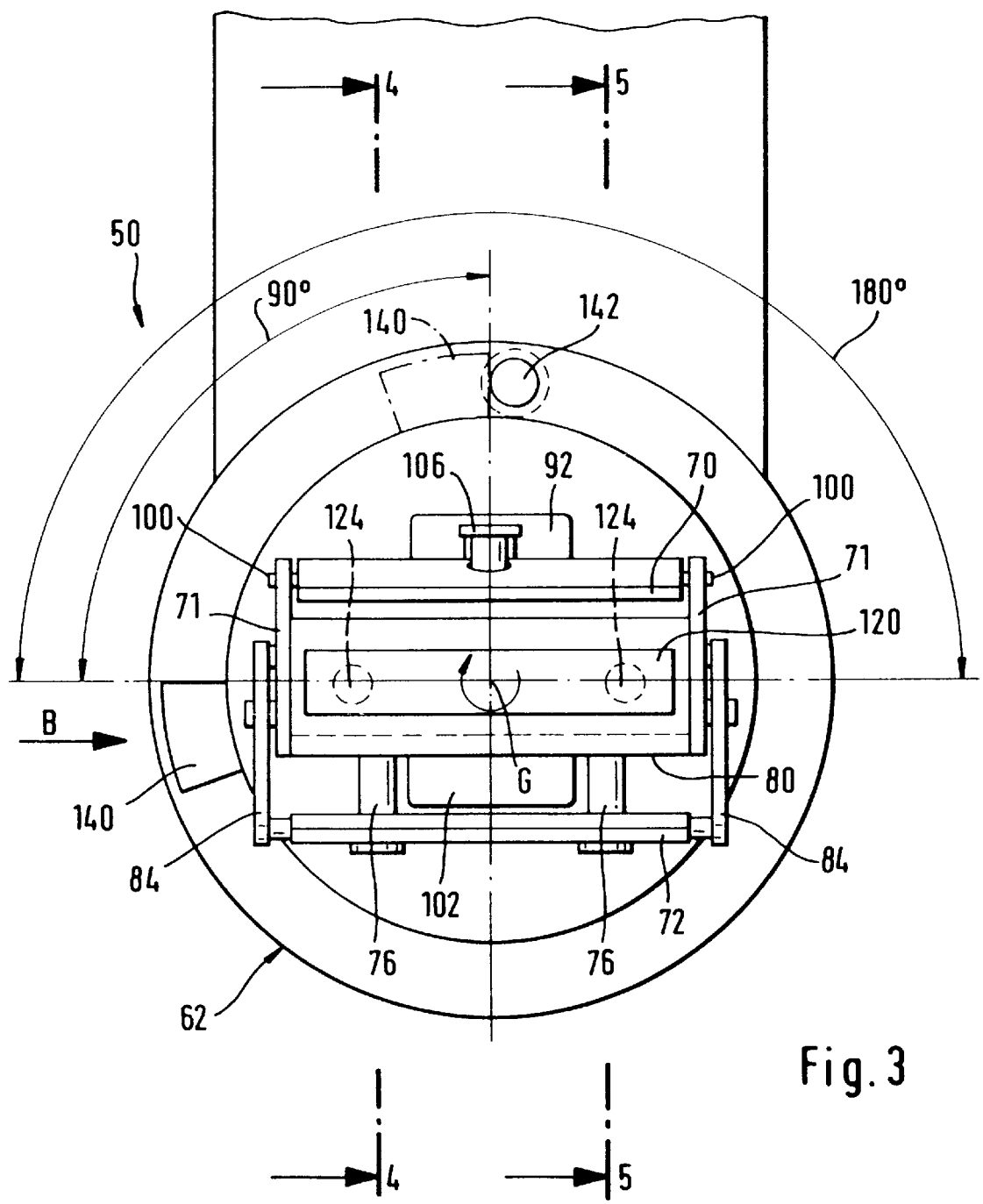
FIG. 3 is a front view of the gripper means according to FIG. 2 in the direction of arrow A.
Figure 4:
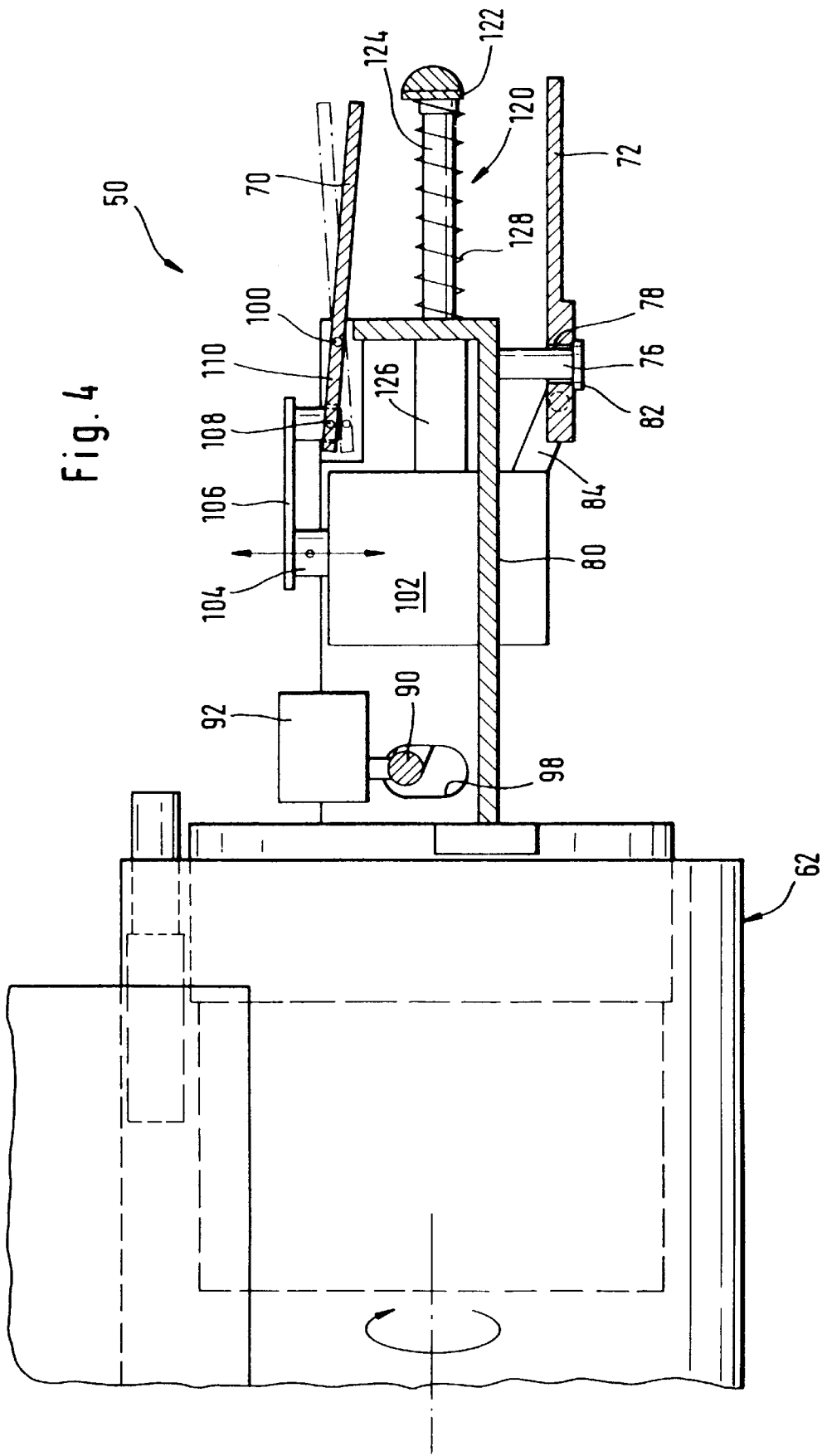
FIG. 4 is a section along line 4/4 in FIG. 3.
Figure 5:
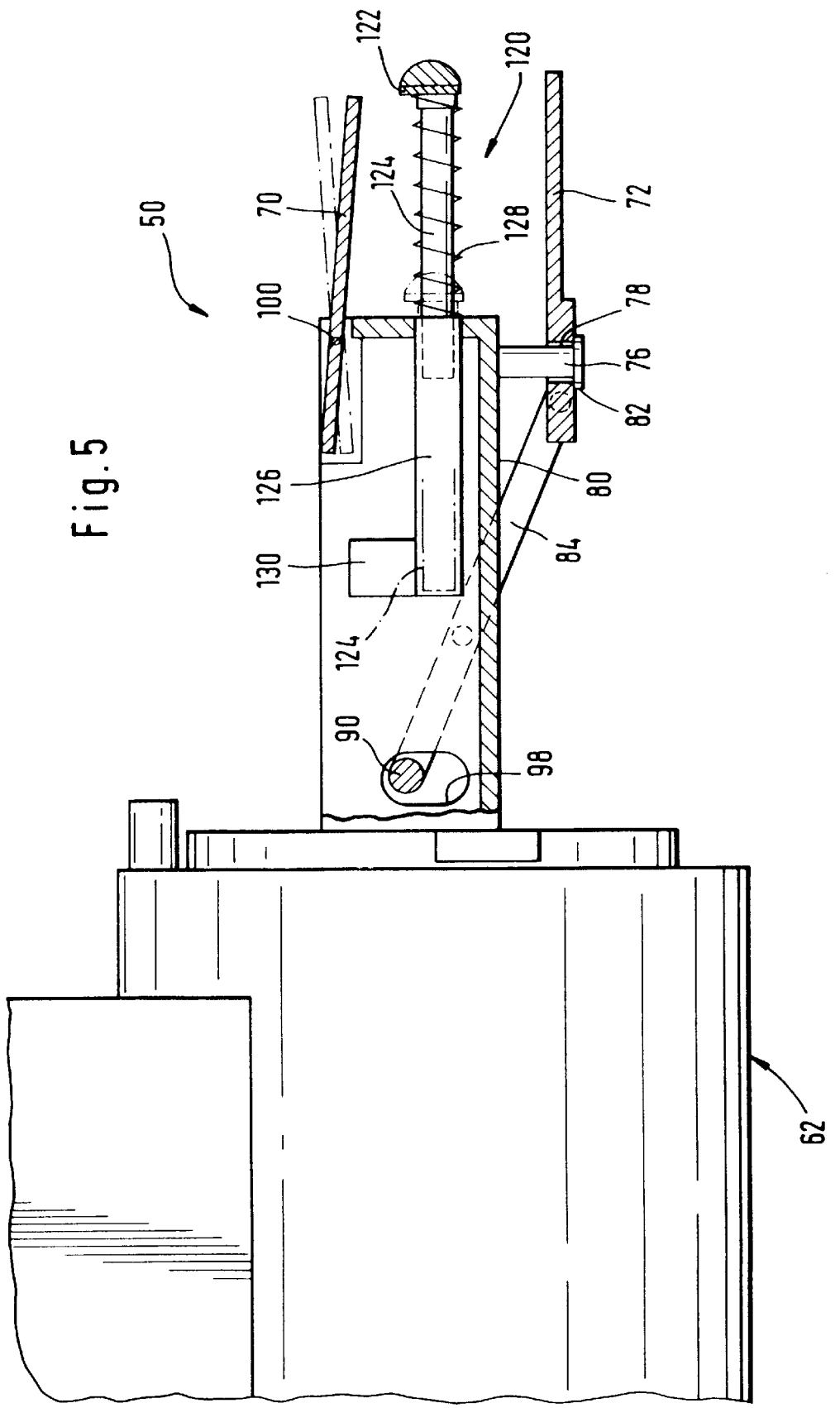
FIG. 5 is a section along line 5/5 in FIG. 3.
Figure 7:
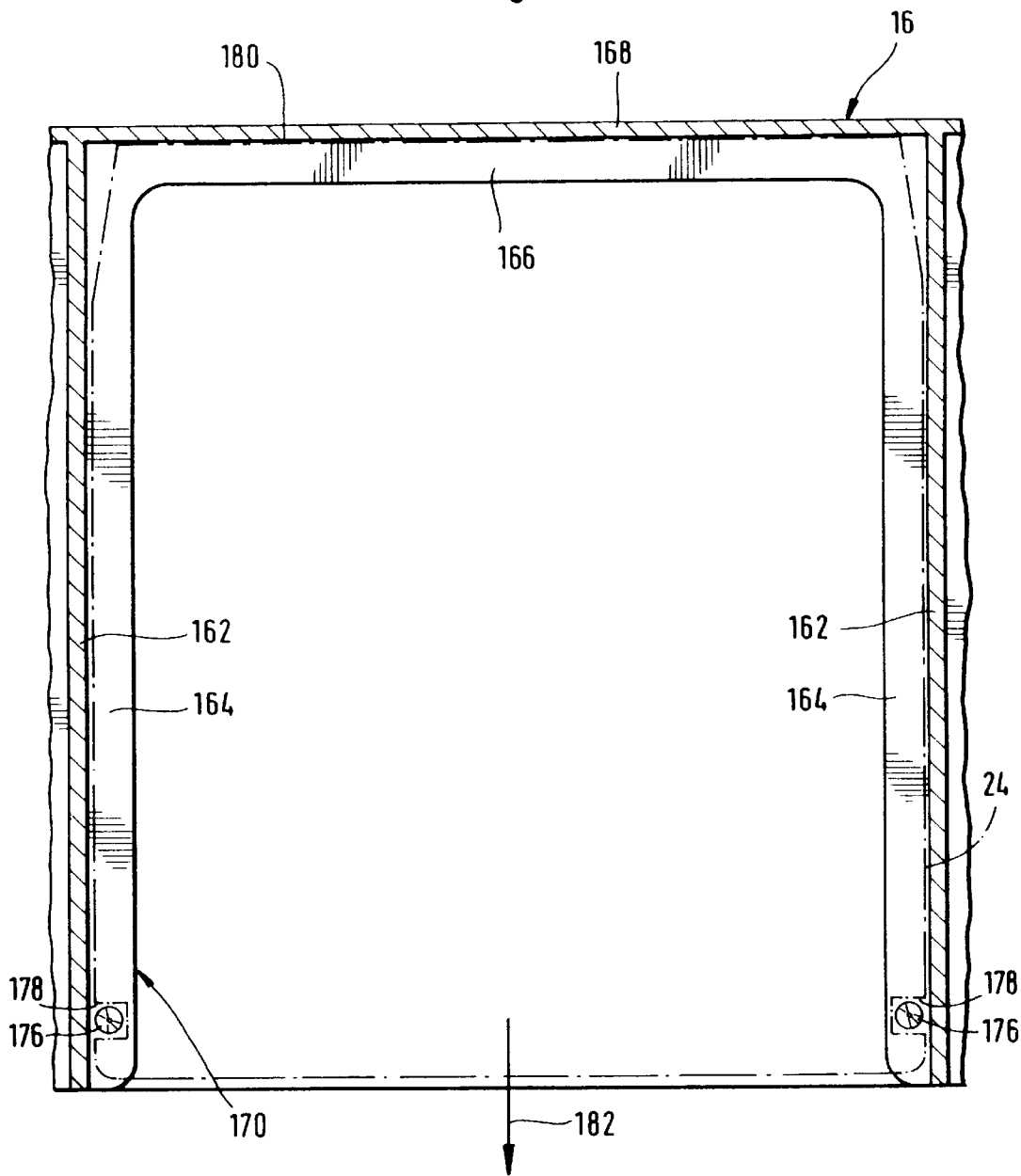
FIG. 7 is a section along line 7/7 in FIG. 6.

For this purpose, the adjustable gripper finger 72 is, as illustrated in FIGS. 3 and 4, guided on two guide bolts 76 by means of guide bores 78 for adjustment parallel to the first gripper finger 70 in the direction of the space between them. The two guide bolts 76 extend away from an underside 80 of the housing 60 located opposite the first gripper finger 70. The tape cassette position of the adjustable gripper finger 72 is determined by a head 82 borne by the guide bolts 78, against which the second adjustable gripper finger 72 can abut, whereas the disk cassette position is determined by the underside 80 of the housing, against which the second adjustable gripper finger 72 can likewise abut in this position.

The second gripper finger 72 is adjusted via two adjusting levers 84 arranged on opposite sides thereof. These levers are connected articulatedly to the second gripper finger 72 at one end 86 facing the second gripper finger 72 and at an opposite end 88 to an actuating bolt 90 extending between the two adjusting levers 84. This actuating bolt is movable by an adjusting drive 92, preferably in the form of a pneumatic or hydraulic operating cylinder or an electromagnetic drive. Between the two ends 86 and 88 each adjusting lever 84 is mounted so as to pivot about a bearing bolt 94 on an outer side 96 of the housing 60.

The adjusting drive 92 is arranged between the two side walls 71 so that the actuating bolt 90 extends through respective elongated holes 98 in the side walls 71 as far as the adjusting levers 84. Depending on the movement of the actuating bolt 90 the second gripper finger 72 is movable either into the tape cassette position or into the disk cassette position.

The first gripper finger 70 is movable for gripping the respective data carrier cassette 24 or 26. This finger lies between the two side walls and is mounted in these by means of bearing pins 100. Movement of the first gripper finger 70 is brought about by a gripper drive 102 which is likewise arranged between the side walls 71 and is designed, for example, as a hydraulic or pneumatic cylinder or magnet and has a linearly displaceable drive bolt 104 as well as a bridge 106 held thereon which is connected via a joint 108 to a rearward lever 110, whereby the rearward lever 110 is located on the other side of the bearing pin 100 from the first gripper finger 70.

Due to movement of the drive bolt 104, the first gripper finger 70 is movable from an open position, illustrated by a dash-dot line in FIG. 4, into a closed position, illustrated by a solid line in FIG. 4. In the last-named position, the respective data carrier cassette 26 or 24 is gripped and held securely between the first gripper finger 70 and the second gripper finger 72 whereas in the open position of the first gripper finger 70 the respective data carrier cassette 24 or 26 is freely insertable into or movable out of the space 74.

Furthermore, the gripper means 50 is also provided with an ejector 120 illustrated in FIGS. 2 to 5 which has a front crosspiece 122 guided by means of two guide bars 124 at the side walls 71. For this purpose the side walls 71 bear guide sleeves 126, in which the guide bars 124 are preferably guided parallel to the axis G. In addition, the crosspiece 122 is acted upon by springs 128 surrounding the guide bars. These springs are supported, on the one hand, on the housing 60 and, on the other hand, on the crosspiece 122 and act on the crosspiece 122 in the direction towards a forward position illustrated in FIGS. 2 to 5 by solid lines. When a data carrier cassette 24 or 26 is inserted into the space 74, the crosspiece 122 is pushed into a rearward position contrary to the action of the springs 128; this position is represented in FIG. 2 by solid lines and in FIG. 5 by dash-dot lines.

In this pushed-in position of the ejector 120, this actuates a sensor 130, by means of which a complete gripping of the respective data carrier cassette 24 or 26 can be detected. This takes place, for example, due to actuation of the sensor 130 by means of one of the guide bars 124.

The gripper means 50 is rotatable about the axis G by means of the rotary drive 64 from a first, horizontally aligned end position, illustrated in FIG. 3, into a second end position turned through 180°, whereby the two end positions turned through 180° can be predetermined, for example, internally by stops in the rotary drive 64.

Moreover, a rotation through a defined angle of 90° into an intermediate position can be carried out in addition. For this purpose, the rearward housing section 66 is provided with a cam 140 which can be brought into engagement on a stop pin 142 in the position of the gripper means 50 turned through 90°. In this case, the stop pin 142 is in its advanced position. The stop pin 142 is, for its part, mounted on the support 62 for the gripper means and can be moved by means of a feed drive 144 into its advanced position illustrated in FIG. 2 by solid lines or into a withdrawn position illustrated in FIG. 2 by broken lines. In the advanced position, the stop pin 142 prevents any further rotation of the gripper means into its position turned through 180° and, therefore, clearly defines with the cam 140 the intermediate position of the gripper means 50 turned through 90°, whereby the rotary drive 64 holds the cam 140 in engagement on the stop pin 142. If the stop pin 142 is withdrawn by the feed drive 144, the rotary drive 64 rotates the gripper means 50, proceeding from the end position illustrated in FIG. 3, until it reaches its end position turned through 180° which—as already mentioned—is defined by an internal stop in the rotary drive 64.

All the movements of the handling unit 12 as well as of the adjusting drive 92, the gripper drive 102 and the feed drive 144 are controlled by a control designated as a whole as 150 which, in addition, turns the rotary storage towers 30 such that the respective, desired data carrier cassette 24 or 26 is in a position in which the handling device 12 can grip it with the gripper means.

The second storage units 16 for the disk cassette 24 are, as illustrated on an enlarged scale in FIG. 6, provided with the disk compartments 32 lying one above the other, whereby consecutively superimposed disk compartments 32 are separated from one another by supports 160 for the disk cassettes 26. The supports 160 thereby protrude from walls 162 of the storage units 16 which extend essentially vertically and form on opposite sides of a disk compartment 32 lateral ledges 164 protruding from the walls 162 in the region of the side walls 162 which merge into a rearward ledge 166 in the region of a rear wall 168 of the storage unit 16. A recess 170 is therefore located between the lateral ledges 164 and the rearward ledge 166. This recess makes it possible, in the case of a disk cassette 24 lying in a disk compartment 32, for one of the gripper fingers 70 or 72, preferably the gripper finger 72, to move in between the lateral ledges 164 and engage under the disk cassette 26 on an underside 172 while the respectively other gripper finger, in particular the gripper finger 70, engages over the disk cassette 24 on its upper side 174. By movement of the movable first gripper finger 70 into its closed position, the disk cassette 24 can therefore be gripped, held firmly and removed or inserted in the respective disk compartment 32 without any collision with the respective supports 160.

In order to store the disk cassettes 24 securely in the disk compartments 32, upwardly projecting retaining pins 176 are arranged in a forward region of the lateral ledges 164. These pins are preferably conical in design and engage in a peripheral recess 178 in the disk cassette 24 when this is completely inserted into the disk compartment 32, rests on the support 160 and thereby preferably abuts with its rear wall 180 on the rear wall 168 of the storage element 16. This means that the disk cassette 24 is secured against falling out of the respective disk compartment 32 in the direction of its removal direction 182.

The disk cassette is removed from the respective disk compartment 32 in that the gripper means 50 grips the disk cassette 24 lying in the respective disk compartment 32 with the two gripper fingers 70 and 72 on its flat sides, i.e. in this case its upper side 174 and its lower side 172, lifts it to such an extent that the retaining pins 176 no longer engage in the recesses 178 and then draws it out in removal direction 182.

The disk cassette 24 is inserted into the respective disk compartment 32 in the reverse manner. The distances between the supports 160 are selected such that they are larger than the height of the disk cassettes 24 plus the height of the retaining pins 176.

As a result of the adjustability of the second gripper finger 72 it is, in addition, possible to select the distance between the supports 160 to be as small as possible without needing to take into account the distance between the gripper fingers 70 and 72 in the tape cassette position. This results in an optimum storage density for the disk cassettes 24 in the storage units 16.

The tape cassettes 26 are secured in position in the first storage units 18 in a similar manner. These storage units have a base 190, on which the tape cassettes 26 rest with their underside 192. This base 190 has either a lip 194 at a front end which protrudes upwardly and engages over a front side 196 of the tape cassette 26 in a lower region or, alternatively thereto, a nose 198 protruding upwardly in a front region of the base 190 and engaging in a corresponding recess 200 in the tape cassette.

Figure 8:
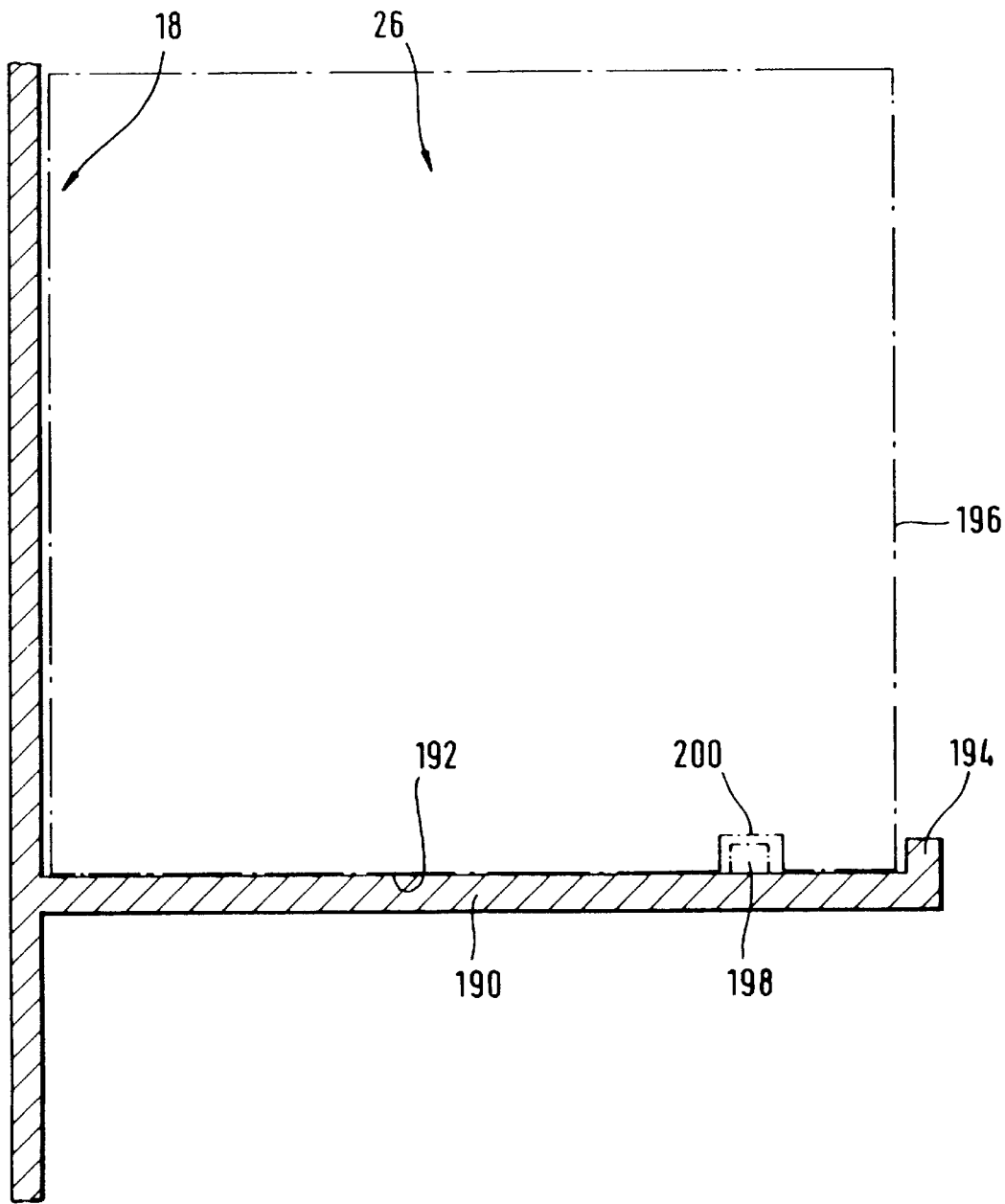
FIG. 8 is a vertical section through a storage element for tape cassettes.

The tape cassette 26 is likewise removed in that it is gripped by the gripper means in the position turned through 90° in comparison with the position illustrated in FIG. 3 and the tape cassette 26 is lifted to such an extent that either the nose 194 no longer engages over the front side 196 or the cam 198 does not engage in the recess 200, as illustrated in FIG. 8.

In order to identify the disk cassette 24, an optical identification system 210 is arranged next to the gripper means 50 and this is in a position to read a bar code 214 or 216 arranged on an end face 212 of a disk cassette 24.

Since the storage disk 25 arranged in a disk cassette 24 can have information written on both sides 213 and 215, an identification in the form of a bar code 214 and 216, respectively, is associated with each side.

Figure 9:
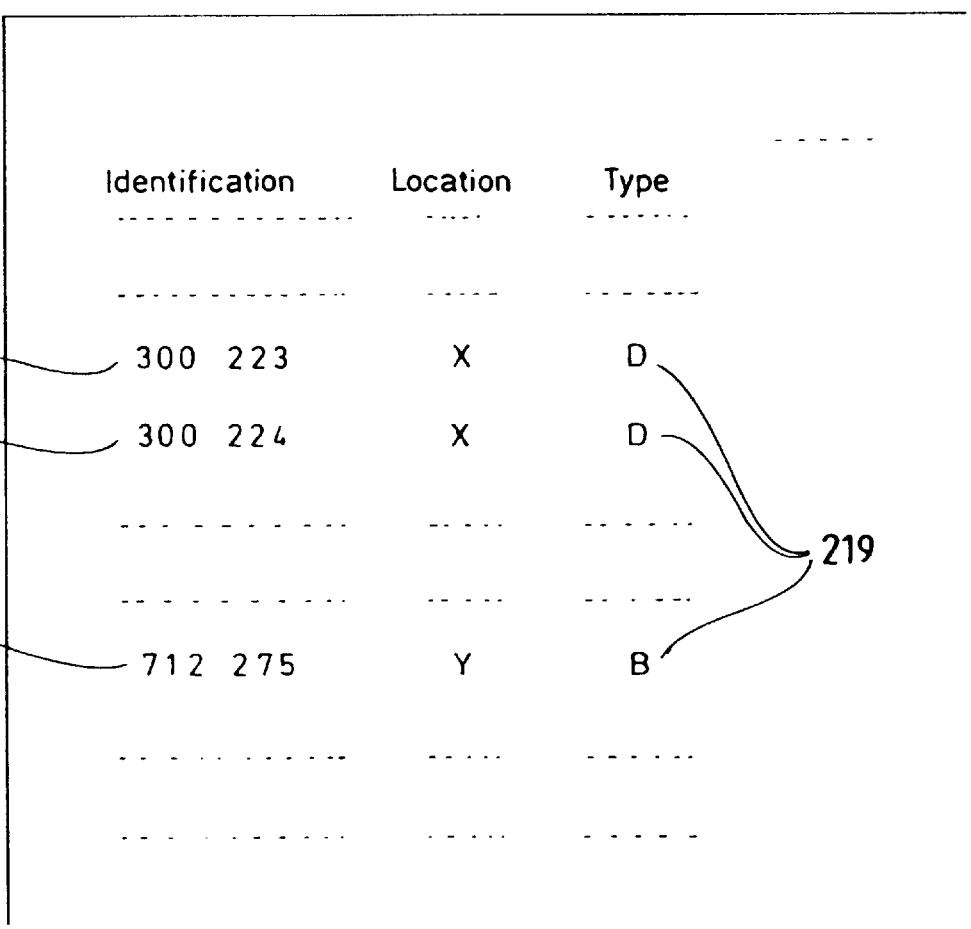
FIG. 9 is a schematic illustration of a data file for the identifications of data carriers.

So that the control 150 is in a position to recognize the location in the archiving system for data carriers at which the respective disk cassette 24 is to be found, a data file which is schematically illustrated in FIG. 9 is stored in a computer associated with the control 150. An identification of the respective data carrier and the storage location are entered in this data file.

In accordance with the invention, each side 213, 215 of a storage disk 25 in one of the disk cassettes 24 is listed with its own identification 214, 216 so that in the data file illustrated in FIG. 9 two identifications for two separate data carriers are stored for each disk cassette 24. In this respect, the same location, namely the location X, for example in the storage facility 10, is entered as storage location for both identifications of the disk cassette 24.

In addition, a designation 219 for the type of data carrier cassette 24, 26 is stored in the data file illustrated in FIG. 9. This means that together with the identification and the location the control can recognize how the distance between the gripper fingers 70, 72 is to be adjusted, for example into tape cassette position or into disk cassette position, and how the gripper fingers are to be aligned for grabbing movement towards the data carrier cassettes 24, 26. In the case of a tape cassette 26 in the storage facility 10, this is the intermediate position, in the case of a disk cassette 24 one of the end positions, for example the end position illustrated in FIG. 3.

If a request is now sent to the control 150 to grip a data carrier in the storage facility 10 designated by a certain identification in the data file and to transport this to the read/write unit 36, the data file illustrated in FIG. 9 will give the respective location and the respective type but not in what direction of rotation the disk cassette 24 is stored, i.e., to what side of the storage disk in the stored position the read/write unit 36 can have access.

In accordance with the invention, the handling unit 12 moves the gripper means 50 into a position in front of the data carrier cassette 24, 26, proceeding from which a last grabbing movement towards the data carrier cassette 24, 26 takes place, during which this enters the space 94. This takes place, in particular, such that the optical identification system 210 reads the identification 214 or 216 on one of the two halves 220 or 222 of the end face separated by a center line 218.

The optical identification system 210 preferably reads the identification 214 on the left half 220 of the end face, as illustrated in FIG. 10.

What steps are then checked by the control 150 is illustrated in FIG. 11 on the basis of the search for a data carrier having the identification 300 223.

If the disk cassette 24 is lying in the disk compartment 32 at the location X in the stored position as illustrated in FIG. 10, the optical identification system 210 reads the bar code 214 on the left half 220 of the end face which bears the identification 300 224, as illustrated in FIG. 10, while approaching the disk cassette 24 by means of the gripper means 50.

First of all, the control 150 checks whether the identification 214 as read is identical to the specified identification. If this is the case, the disk cassette 24 is gripped and transported further. If, as illustrated in FIG. 10, this is not the case, then in the case of a designation of the data carrier cassette as disk cassette with D with, for example, an uneven desired identification, the identity with the identification correlated with this, namely the next higher number, is checked. If this identity is not given, an error is reported; if this identity is given, the control 150 knows that the approached disk cassette 24 does indeed have the data carrier with the desired identification but is not inserted such that the desired side 215 is available for reading or writing in the read/write unit 36.

For this reason, the gripper means 50 removes the disk cassette 24 from the corresponding disk compartment 32 and turns it, however, through 180° by means of the rotary drive 64.

Thus, the control 150 knows that the side of the storage disk designated with the desired identification is now available for access in the read/write unit 36 and the disk cassette 24 can now be transported by means of the handling unit 12, for example, to the desired read/write unit 36 and in this unit the data carrier with the desired identification can be read.

In the case of an even number as desired identification, the procedure is the same as that illustrated in the flow chart in FIG. 11 with the difference that after the first check for identity it is not the identity with the next higher number as identification which is checked but the identity with the next lower number as identification. As for the rest, the same subsequent steps are carried out.

In the case of a data carrier of a tape cassette, only one identification 215 for the respective data carrier cassette 26 is entered in the data file illustrated in FIG. 9 and, in addition, the designation B so that when a request is received from a host computer the control 150 recognizes that this is a tape cassette, moves the gripper finger 72 accordingly into the tape cassette position and turns the gripper means 50 into the intermediate position with the stop pin extended. In addition, the control 150 recognizes that with this data carrier cassette 26 there cannot be any position turned through 180° and takes this into consideration for identifying the data carrier cassette 26 via the identification 215.

A second embodiment of an inventive archiving system for data carriers is, in principle, of the same construction as that illustrated in FIG. 1.

This second embodiment of the inventive archiving system for data carriers likewise comprises the first storage units 18 with the storage locations 22 for data carrier cassettes designed as tape cassettes 26.

Figure 12:
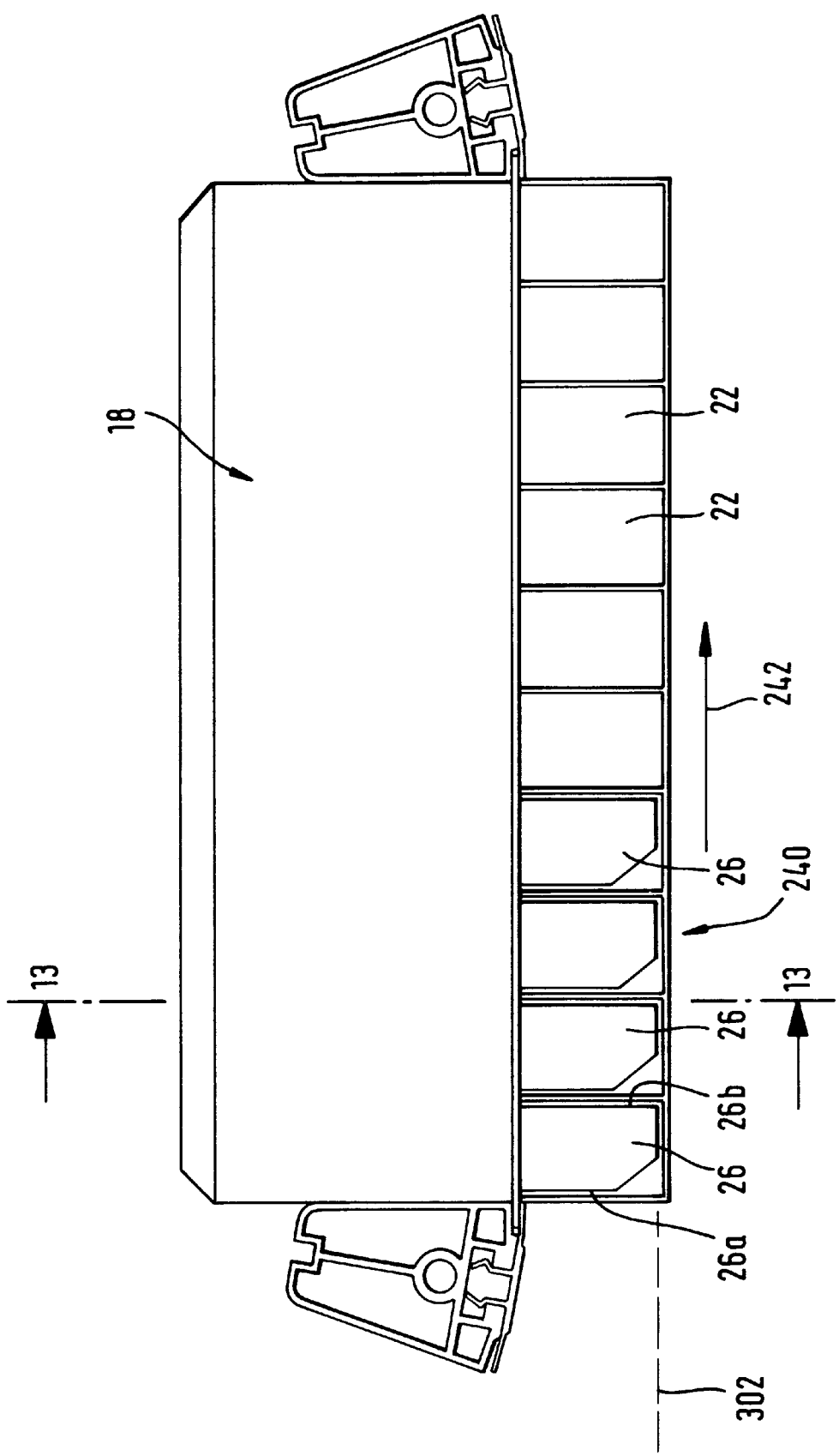
FIG. 12 is a plan view onto a first storage element of a second embodiment of an archiving system for data carriers.
Figure 13:
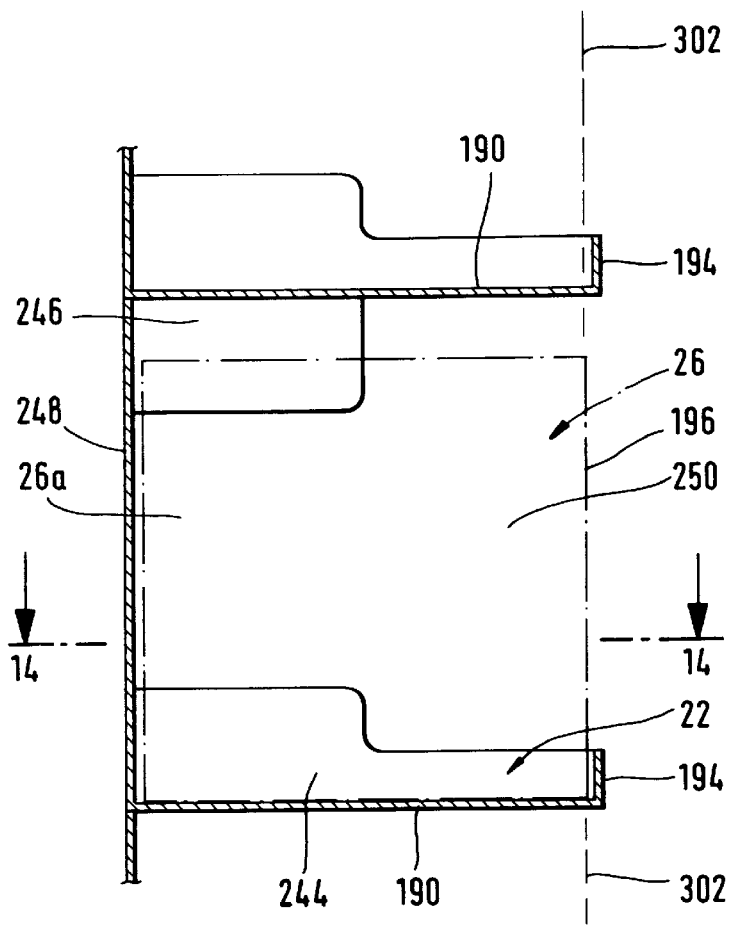
FIG. 13 is a section along line 13—13 in FIG. 12.
Figure 14:
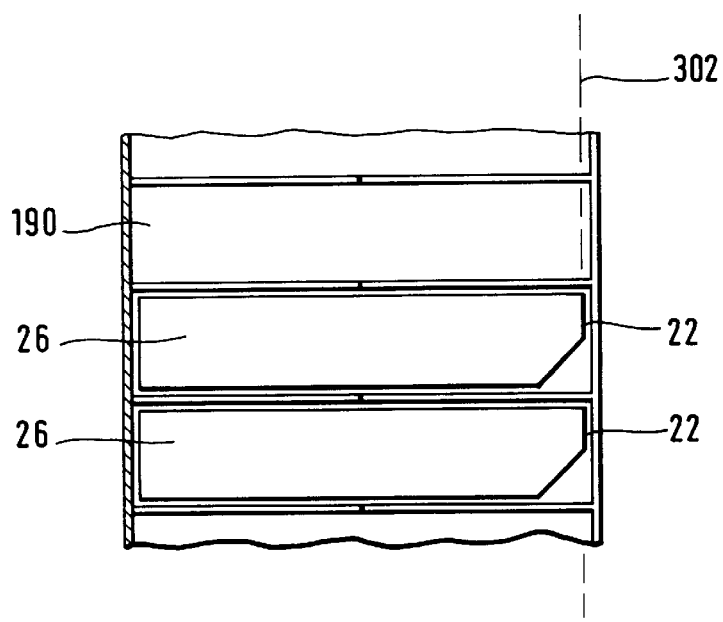
FIG. 14 is a section along line 14—14 in FIG. 13.
Figure 15:
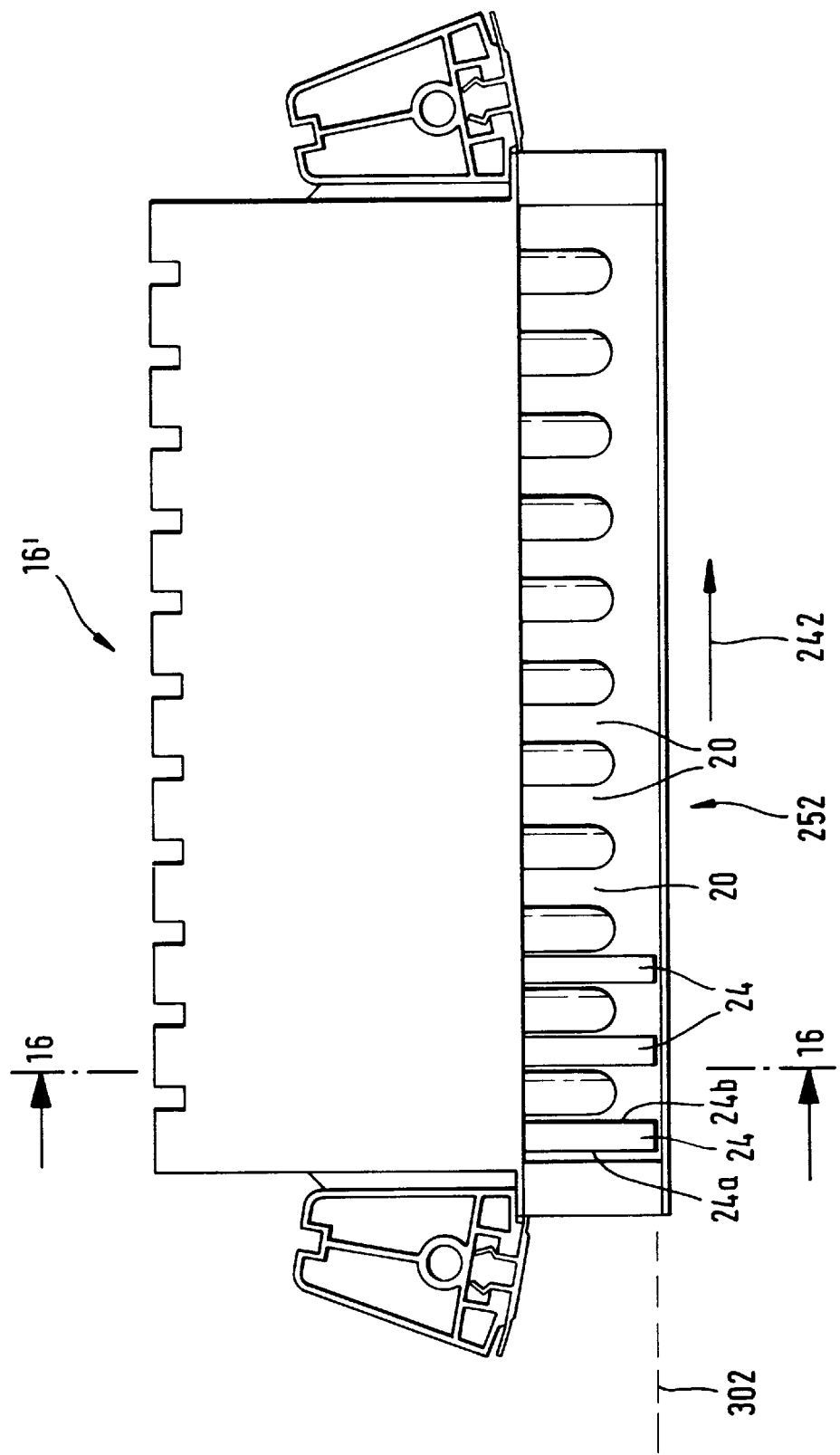
FIG. 15 is a plan view similar to FIG. 12 onto a second storage element of the second embodiment.
Figure 16:
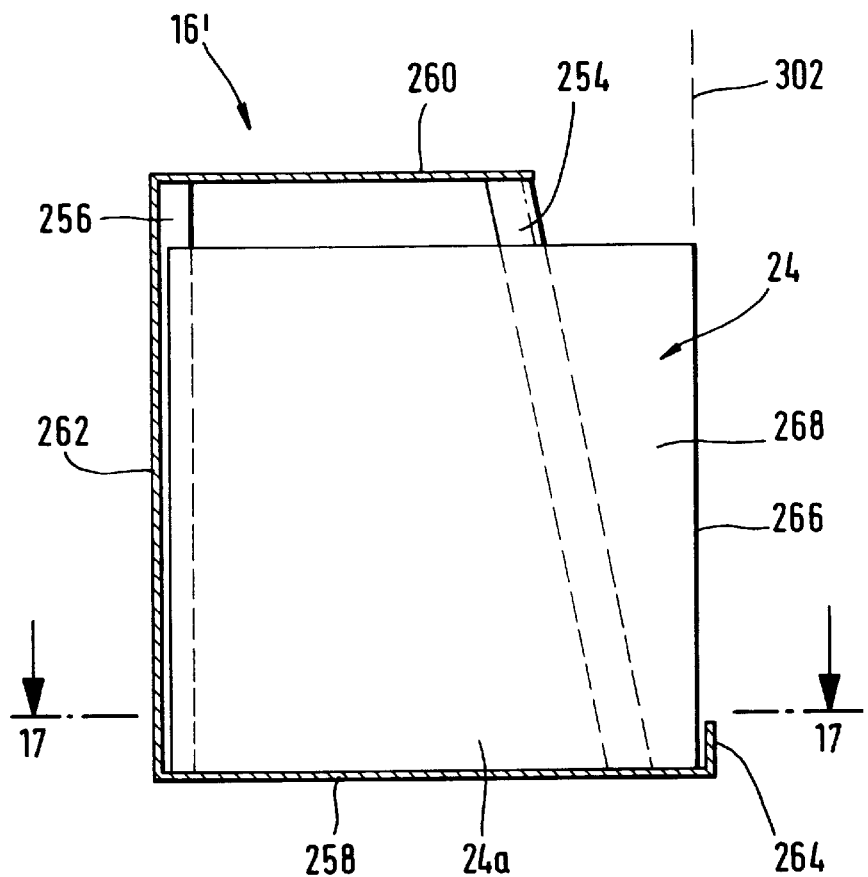
FIG. 16 is a section along line 16—16 in FIG. 15.
Figure 17:
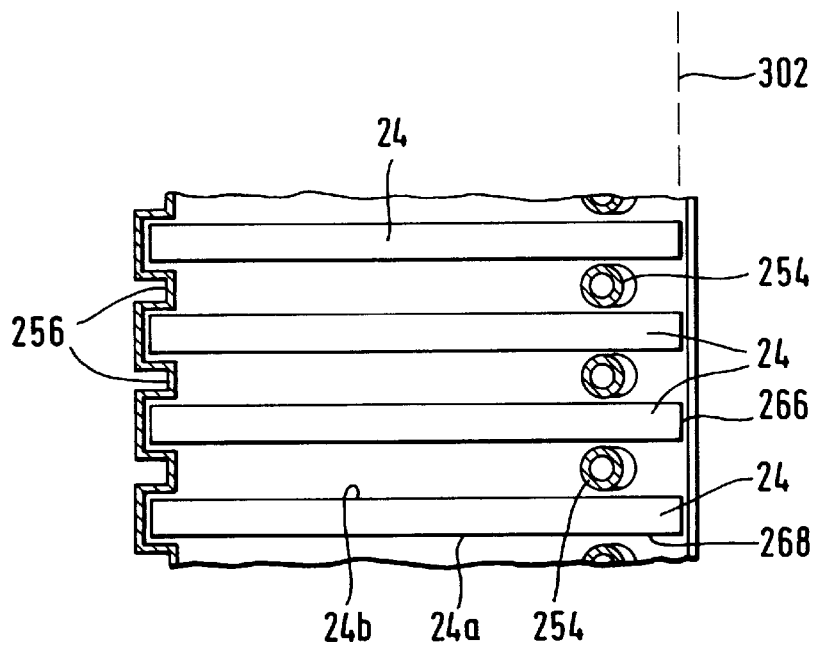
FIG. 17 is a section along line 17—17 in FIG. 16.
Figure 18:
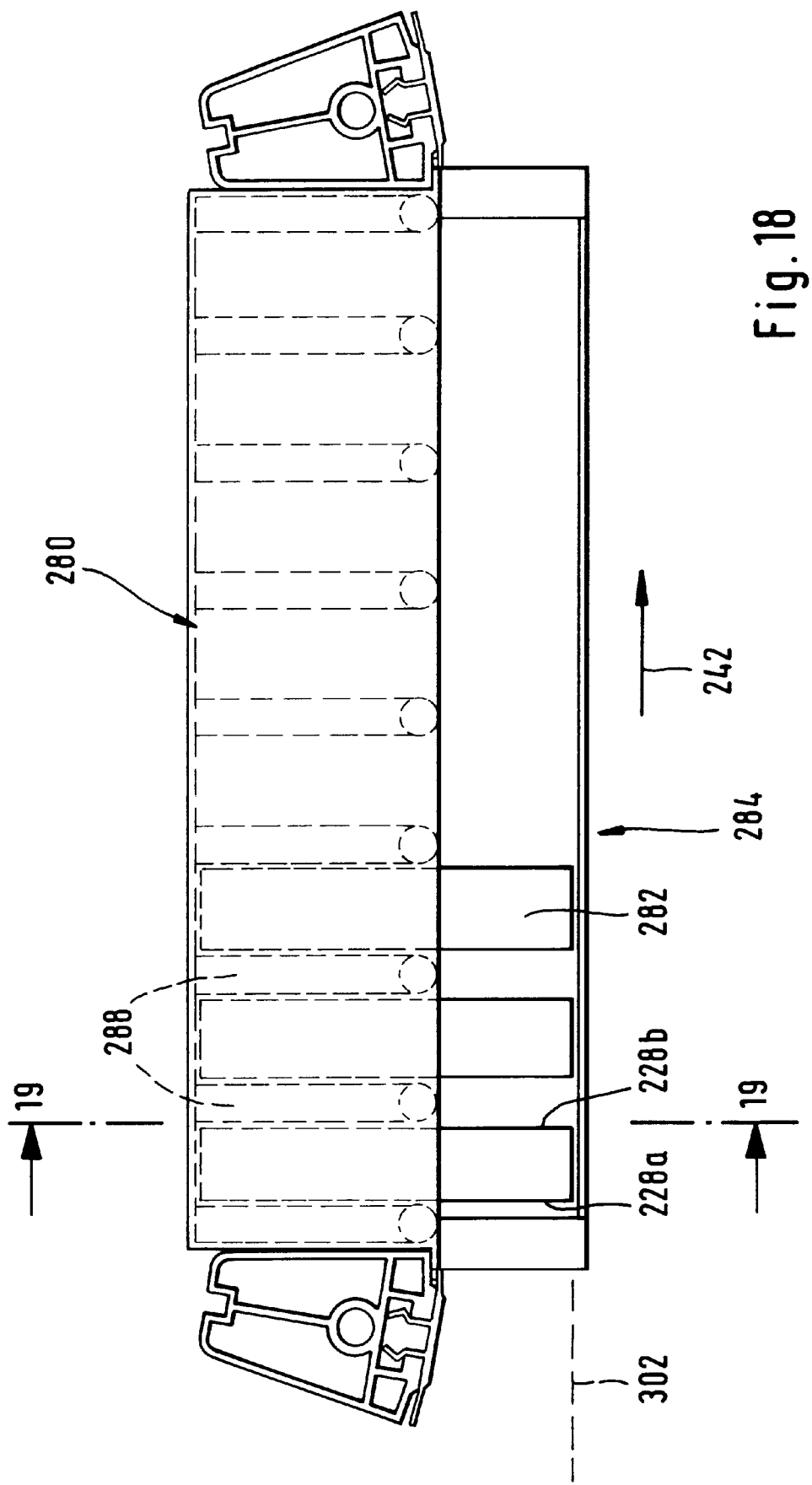
FIG. 18 is a plan view similar to FIG. 12 onto a third storage element of the second embodiment.

In the storage units 18, the tape cassettes 26 are, as illustrated in FIGS. 12, 13 and 14, arranged in a row 240 such that their flat sides 26a and 26b are aligned essentially perpendicular to a storage direction 242 which coincides with a longitudinal direction of the row 240.

The individual storage locations 22 of the row 240 are, as illustrated in FIG. 13, separated from one another by a lower web 244 and an upper web 246, whereby the lower web 244 rises from the base 190 of the storage elements 18 and extends from the front lip 194 over the entire depth of the storage location 22 as far as a rear wall 248 of the storage element 18.

The upper web 246 extends from the rear wall 248 on a lower side of the base 190 of the row 240 located thereabove only as far as half the depth of the storage location 22 towards the front in the direction of the lip 194 so that the tape cassette 26 lying in the storage location 22 is free to be gripped with a forward region 250 of the flat sides 26a, b adjoining its front side 196. The webs 244 and 246 preferably have a thickness of a few, in particular 1 to 3 mm.

In contrast to the first embodiment, the disk cassettes 24 are stored vertically in the storage units 16', namely such that their flat sides 24a and 24b extend in vertical direction. The storage direction 242 extends, as in the storage units 18 according to FIG. 12, in the same direction, namely in the horizontal direction, so that rows 252 of disc cassettes 24 are likewise formed in the storage elements 16'.

Spacer elements 254 and 256 are provided in the storage elements 16' between consecutive disk cassettes 24, whereby the spacer elements 254 and 256 each extend from a base 258 as far as an upper wall 260 of the storage element 16'. In the simplest case, the spacer element 254 is designed as front spacer element in the form of a tube while the spacer element 256 is designed as a rear-side inward bulge of a rear wall 262 of the storage element 16'. The two spacer elements 254 and 256 guide the disk cassettes 24 with a slight clearance in the respectively provided storage locations 20. In addition, a lip 264 rises from the base 258 of a front side lying opposite the rear wall 262 and this lip secures the disk cassettes 24 from falling out forwards.

In order to make not only a defined positioning of the disk cassettes 24 in the storage elements 16' but also a good access to these possible, the spacer element 254 is arranged offset from the lip 264 in the direction of the rear wall 262 and extends approximately in a central region of the storage unit 16' located between the lip 264 and the rear wall 262 from the base 258 to the upper wall 260 so that a forward region 268 of the flat sides 24a, b which adjoins a front side 266 of the disk cassette 24 is available for gripping the disk cassette 24.

The disk cassette 24 is removed in the same way as that described in conjunction with the first embodiment for the removal of a tape cassette 26.

The second embodiment of an inventive archiving system for data carriers comprises, in addition, a further storage element 280 for an additional type of data carrier cassettes 282 which are not as thick as the tape cassettes 26 but are thicker than the conventional disk cassettes 24. These additional data carrier cassettes can be either special disk cassettes or a different type of tape cassette, for example VHS cassettes.

In the case of this storage element, the data carrier cassettes 282 are likewise arranged vertically, forming a row 284 along the storage direction 242, whereby the flat sides 282a and 282b likewise extend vertically to the storage direction 242. Moreover, the additional data carrier cassettes 282 are likewise arranged in spaced relation to one another by means of spacer elements 286 and 288, whereby the spacer element 286 extends from a base 290 of the storage element to a rear wall 292 and ends approximately in a central region of this wall while the spacer element 288 extends from the central region of the rear wall 292 as far as an upper wall 294. The upper wall 294 extends from the rear wall 292 to approximately a central region of the base 290.

A lip 296 also rises from a front side of the base 290 located opposite the rear wall 292 and this serves to secure the additional data carrier cassettes 284 in place. The spacer elements 286 and 288 are, therefore, likewise arranged such that a forward region 300 of the flat sides 282a, b adjoining a front side 298 is available for gripping by the gripper fingers of the gripper means.

All the storage elements 16', 18 and 280 of the second embodiment of the inventive archiving system for data carriers are arranged such that the respective front sides 196, 266 and 298 of the data carrier cassettes 26, 24 and 282 are located in a plane 302 which, at least in access position of the respective storage element 18, 16' and 280, is spaced essentially at a defined distance from the track 56 or the handling unit 12 so that the handling unit 12 can have access to all the storage elements 18, 16' and 280 by way of essentially the same movements.

For gripping the different data carrier cassettes 26, 24 and 282 a gripper means 320 is provided which is, in principle, of the same construction as the gripper means 50. A support for the gripper means which is of identical design to that of the gripper means 50 is likewise provided with a rotary drive with which a housing 322 of the gripper means 320 is rotatable about an axis G. In addition, the gripper means has a stationary gripper finger 324 and a movable gripper finger 326. The stationary gripper finger 324 is comparable to the second adjustable gripper finger but the stationary gripper finger 324 is not adjustable to different thicknesses of the data carrier cassettes. The movable gripper finger 326 is rotatable about a bearing pin 328, in the same manner as in the first embodiment, the only difference being that the movable gripper finger 326 has a greater pivot range.

The pivotable gripper finger 326 is drivable by a gripper drive, which is likewise not illustrated in the drawings and is comparable to the first embodiment, and can be pivoted from a maximally open position to such an extent in the direction towards the stationary gripper finger 324 that, as illustrated in FIGS. 21 and 22, both the thickest data carrier cassettes, namely the tape cassettes 26, and the thinnest data carrier cassettes, namely the disk cassettes 24, can be securely gripped. When the disk cassettes 24 are gripped— as illustrated in FIG. 22—a front region 330 of the movable gripper finger 326 presses essentially linearly onto the flat side 24b of the disk cassette 24 in the front region 268 thereof while the flat side 24a rests on the stationary gripper finger 324 with the front region 268 essentially over the entire surface.

In addition, the maximally open position of the gripper fingers 324, 326 is dimensioned such that it is still possible to securely grip the tape cassettes 26 in this position. For this purpose, the movable gripper finger 326—as illustrated in FIG. 21—merely performs a slight pivot movement and acts on the flat side 26b, namely in the front region 250 thereof, preferably at two places 332 and 334 arranged in spaced relation to one another in the direction of extension of the movable gripper finger 326 since the flat side 26a rests in its front region 250 only over a short distance, seen in the direction of extension of the stationary gripper finger 324, on this finger which is due to the front inclined face 336 of the tape cassette 26.

As for the rest, the gripper means 320 is also provided with an ejector 340 which is essentially of an identical design to the ejector of the gripper means 50 so that reference can be made in full to the explanations in this respect. In modification of the ejector 120 of the first embodiment, only a crosspiece 342 of the ejector 340 is widened in the direction between the gripper fingers 324 and 326 so that this can act on all the data carrier cassettes 26, 24 and 282.

Figure 23:
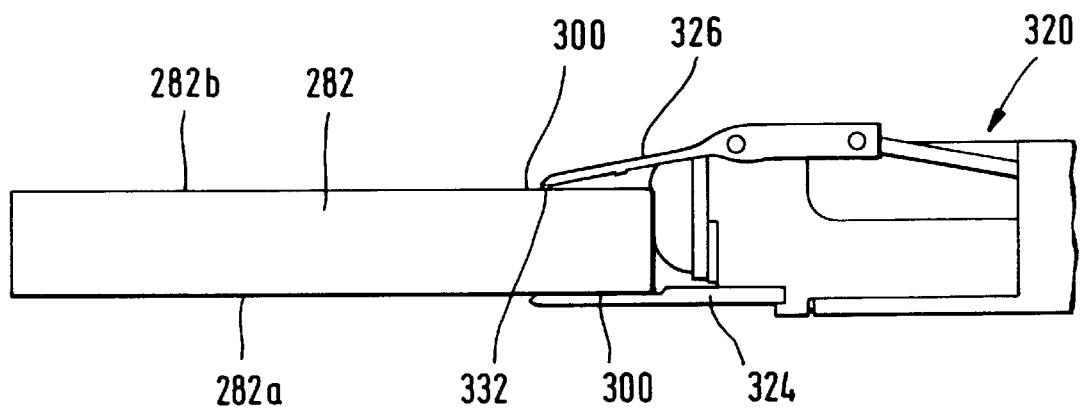
FIG. 23 is a side view similar to FIG. 21 when gripping a third type of data carrier cassette.
Figure 24:
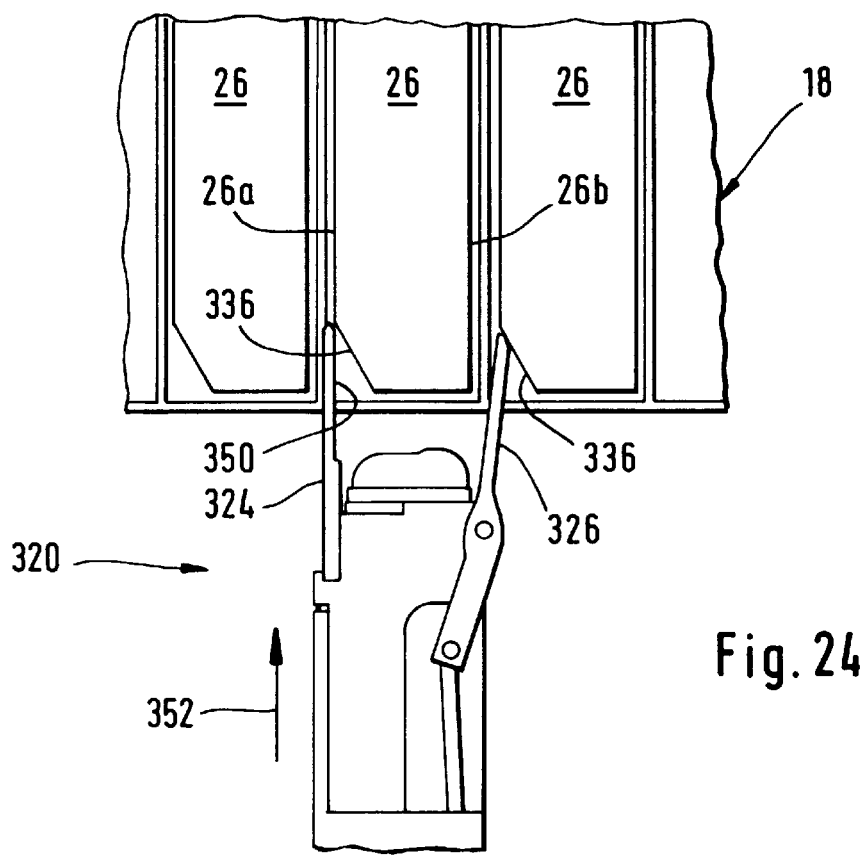
FIG. 24 is a schematic illustration of a grabbing movement for the first type of data carrier cassette.

Apart from the tape cassettes 26 and the disk cassettes 24, the additional data carrier cassettes 282 can also be gripped by the gripper means 320, as illustrated in FIG. 23. In this case, the movable gripper finger 326 likewise rests with its front region 332 essentially linearly on the front region 300 of the flat side 282b while the flat side 282a rests with the front region 300 on the stationary gripper finger 324 essentially over the entire surface.

Tape cassettes in the storage unit 18 are gripped by the gripper means 320 illustrated in FIGS. 21 to 23 in such a way that the tape cassette to be gripped is approached with the stationary gripper finger 324 such that a support surface 350 of the stationary gripper finger 324 is essentially aligned with the flat side 26a. This means that with certain tolerances in the position of the tape cassette 26 to be gripped, the tape cassette is displaced by the stationary gripper finger 324 in the direction of the movable gripper finger 326 insofar as the stationary gripper finger 324 acts on the inclined surface 336 during insertion of the gripper means 320 in the direction 352 during the grabbing movement.

The movable gripper finger 326 can, in its maximally open position, likewise act on the inclined surface 336 of the adjacent tape cassette 26 and move this away from the tape cassette 26 to be gripped. This means that the two gripper fingers 324 and 326 have the chance of being inserted between the tape cassettes 26 in the direction 352 to such an extent that they engage over the flat sides 26a and 26b of the data carrier cassette to be gripped and can therefore grip the data carrier cassette securely. This movability of the tape cassettes 26 is possible due to the tolerances in the storage locations 22.

As illustrated in FIGS. 25a to c, one of the disk cassettes 24 is, for example, gripped according to a different procedure. When moving towards one of the disk cassettes 24, the stationary gripper finger 324 is positioned at a distance from the flat side 24a and, moreover, the movable gripper finger 326 is likewise positioned at a distance from the flat side 24b in the maximally open position. The positioning of the two gripper fingers 324 and 326 is such that there is an essentially equal distance between each of these gripper fingers 324 and 326 and the respective flat side 24a and 24b. This would, for example, be possible in that a center plane 354 of the disk cassette 245 is aligned approximately with a center plane 356 of the gripper means 320. However, the center plane 356 of the gripper means 320 is preferably positioned slightly offset in relation to the center plane 354 in the direction of an increase in the distance between the stationary gripper finger 324 and the flat side 24a. In this position, the gripper means 320 is moved in the direction 352 so that the gripper fingers 324 and 326 engage over the flat sides 24a and 24b. During the movement of the movable gripper finger 326 from the maximally open position into the closed position, the entire gripper means 320 is also moved sideways in a transverse direction 358 such that the stationary gripper finger 324 is moved in the direction towards the flat side 24a and comes to rest on the flat side 24a of the disk cassette 24 positioned with a slight clearance between the two spacer elements 254 while, at the same time, the movable gripper finger 326 is moved towards its closed position to such an extent that it grips the disk cassette 24 securely between itself and the stationary gripper finger 324. In this respect, the flat side 24a rests on the support surface 350 of the stationary gripper finger 324 in the front region 300 over the entire surface.

In order to make such a gripping of the disk cassette 24 possible, the facing flat sides 24b and 24a of disk cassettes arranged on both sides adjacent the disk cassette 24 to be gripped must have a distance between them which allows a collision-free insertion of the gripper fingers 324, 326 in the maximally open position. This is possible when the sum of the widths of the spacer elements 254 arranged on both sides of the disk cassette 24 to be gripped, together with the width of the disk cassette 24 to be gripped, is greater than the external width of the gripper means 320 when the gripper fingers 324, 326 are opened to their maximum.

The same applies for the gripping of the additional data carrier cassettes 282.

As for the rest, the second embodiment is of the same construction as the first and it is operated in accordance with the same procedure so that, in this respect, reference can be made in full to the first embodiment.

Figure 27:
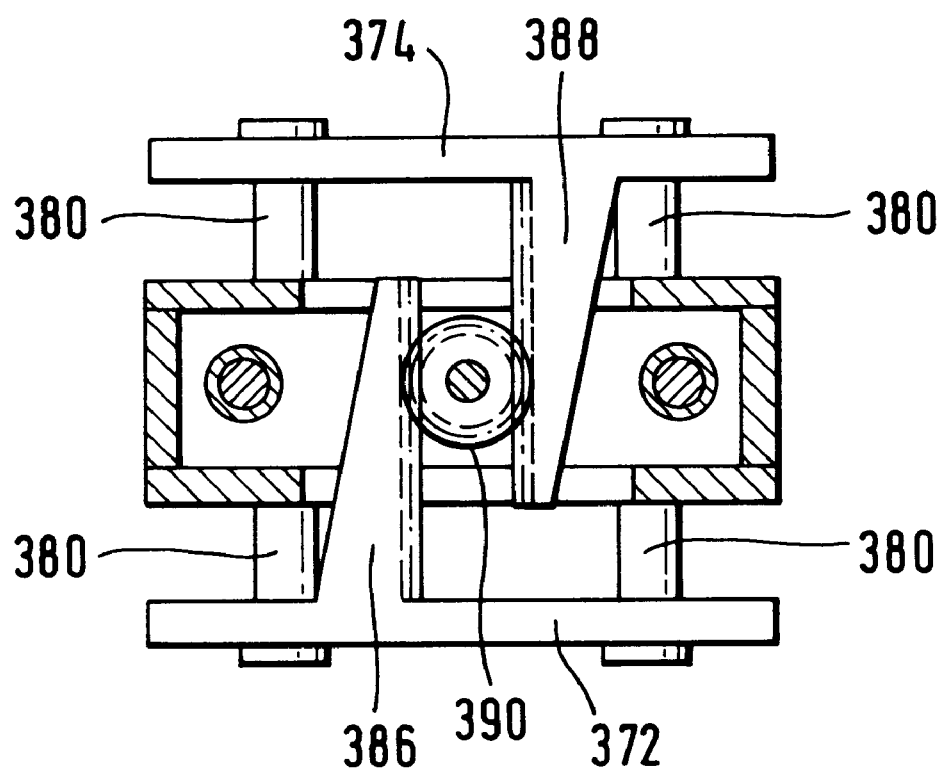
FIG. 27 is a section along line 27—27 in FIG. 26.

A third embodiment of an inventive gripper means, illustrated in FIGS. 26 and 27 and designated as a whole as 370, likewise comprises the support 62 for the gripper means with the rotary drive 64 and a housing 60. Two gripper fingers 372 and 374 are each displaceably guided on this housing, whereby the housing 360, for this purpose, bears two guide bolts 376 for each gripper finger 372, 374. These bolts pass through guide bores 378 of the gripper fingers 372 and 374, whereby the guide bolts 376 guide the two gripper fingers 372 and 374 in parallel alignment to one another in that the guide bores 378 slide on cylinder surfaces 380 of the guide bolts 376.

The maximally open position of the gripper fingers 372 and 374 is thereby defined by a head 382 at the ends of the guide bolts 376.

The two gripper fingers 372 and 374 are movable synchronously towards or away from one another. This means that the two gripper fingers 372 and 374 are always at the same distance from the center plane 384.

In order to be able to move the gripper fingers 372 and 374 synchronously to one another, each of the gripper fingers is provided on a side of the guide bolts 376 located opposite a gripping region with a toothed rack 386 and 388, respectively, which are in engagement with opposite sides of a pinion 390 and extend parallel to one another. The pinion is thereby seated on a shaft 392 of a gripper drive 394 which is preferably designed as a stepping motor. Depending on how the pinion 390 is rotated by the motor 394, the gripper fingers 372 and 374 are movable towards or away from one another.

This means that the gripper fingers 372 and 374 can be moved into a maximally open position with a maximum distance from the center plane 384, in which one of the tape cassettes 26 can, for example, be gripped, and also be moved towards one another to such an extent that even the narrowest disk cassette 24 can be gripped by the two gripper fingers 372 and 374.

In the simplest case, the gripper means 370 is operated such that each of the data carrier cassettes 24, 26 or 282 is approached with the gripper fingers 372 and 374 in their maximally open position and once the gripper fingers 372 and 374 have engaged over the flat sides 24a, b, 26a, b or 282a, b of the respective data carrier cassette 24, 26 or 282 they are moved into the closed position symmetrically to the center plane 384 so that the respective data carrier cassette 24, 26, 282 in the respective storage element 16', 18 or 280 can be gripped and removed. The removal is carried out such that the respective data carrier cassette 24, 26, 282 is lifted once it has been gripped to such an extent that it can be moved out of the respective storage element 16', 18 or 280 over the lip 264, 196 or 296.

This operation is used, in particular, in the second embodiment of the inventive archiving system for data carriers, whereby the gripper means can be positioned with its center plane 384 for gripping all the types of data carrier cassettes 24, 26, 282 such that this plane is aligned with the center plane 354 of the respective data carrier cassette 24. This means that the movement of the gripper means 370 in the transverse direction 358 for gripping is superfluous.

Alternatively thereto, it is, however, also conceivable, when the motor 394 is a stepping motor, to carry out with this motor a preliminary adjustment of a space 396 between the gripper fingers 372 and 374 corresponding to the thickness of the respective data carrier cassette 24, 26 and 282 and not perform the grabbing movement until after this preliminary adjustment of the space 396. Thus, gripping can take place in the manner already explained in detail in conjunction with the first embodiment so that with respect to the grabbing movement towards the respective data carrier cassette 24 or 26 reference can be made to the explanations concerning the first embodiment. However, in contrast to the first embodiment, the preliminary adjustment of the space 396 is possible not only with reference to two different types 24, 26 of data carrier cassettes but also with respect to any optional inbetween types, such as, for example, the data carrier cassettes 282.

I claim:

1. Archiving system for data carriers comprising a storage facility having storage locations for data carriers which includes:
   a first storage unit for storing a first type of data carrier cassettes, and a second storage unit for storing a second type of data carrier cassettes, said first and second types of data carrier cassettes having a different thickness for gripping,
   a read/write facility having a receiver for the data carrier cassettes, said read-write facility including a first read/write unit for the first type of data carrier cassettes, and a second read/write unit for the second type of data carrier cassettes, and
   a handling device for transporting data carrier cassettes from the storage locations to the receiver and vice versa, wherein
      said handling device includes a gripper for the data carrier cassettes, said gripper having gripper fingers adapted such that, with the same gripper fingers, both the first type as well as the second type of data carrier cassettes are transportable from their storage locations in the respective storage units to the receiver of the respective first and second read/write unites and vice versa, and wherein
      said gripper fingers define therebetween a space which is adaptable to the thickness of the respective type of data carrier cassette prior to a gripping movement of said gripper fingers for gripping the respective data cassette in the storage facility.

2. Archiving system for data carriers as defined in claim 1, characterized in that a distance between the two gripper fingers is adjustable to predeterminable distance values, whereby one of the distance values is provided for the first type of data carrier cassettes and the other of the distance values for the second type of data carrier cassettes.

3. Archiving system for data carriers as defined in claim 2, characterized in that the distance values are determinable by stop elements for the gripper fingers.

4. Archiving system for data carriers as defined in claim 1, characterized in that the gripper means is designed as a synchronous gripper means.

5. Archiving system for data carriers as defined in claim 4, characterized in that the gripper means has a drive (394) driving both gripper fingers simultaneously via transmission elements.

6. Archiving system for data carriers as defined in claim 1, characterized in that for adjusting the distance between the gripper fingers one of the gripper fingers is adjustable relative to the other.

7. Archiving system for data carriers as defined in claim 1, characterized in that the adjustable gripper finger is adjustable into positions aligned parallel to one another.

8. Archiving system for data carriers as defined in claim 7, characterized in that the adjustable gripper finger is held on a parallel guide means.

9. Archiving system for data carriers as defined in claim 1, characterized in that the gripper means has one gripper finger movable from an open position into a closed position, i.e. firmly holding the data carrier cassette.

10. Archiving system for data carriers as defined in claim 9, characterized in that the gripper finger movable for firmly holding the data carrier cassette is mounted so as to pivot on the gripper means.

11. Archiving system for data carriers as defined in claim 1, characterized in that the adjustable gripper finger forms the gripper finger stationary during the movement for firmly holding the data carrier cassette and the other gripper finger the gripper finger movable for firmly holding the data carrier cassette.

12. Archiving system for data carriers as defined in claim 1, characterized in that the gripper means has two gripper fingers and that during the respective grabbing movement the gripper fingers engage over flat sides of the respective data carrier cassette in a maximally open position and for gripping the respective data carrier cassette are adapted to be brought into a closed position adapted to any shape of the data carrier cassettes.

13. Archiving system for data carriers as defined in claim 12, characterized in that the data carrier cassettes are arranged in the respective storage units with flat sides extending transversely to a storage direction and that the data carrier cassettes are arranged in storage direction at such a distance from one another that the gripper fingers in the maximally open position are introduceable without collision between facing flat sides of next-but-one data carrier cassettes to grip the data carrier cassette arranged between these flat sides of next-but-one data carrier cassettes.

14. Archiving system for data carriers as defined in claim 13, characterized in that the second type of data carrier cassettes are held at the defined distance from one another by spacer elements.

15. Archiving system for data carriers as defined in claim 12, characterized in that the gripper means engages over the opposite flat sides of the data carrier cassette located in a storage unit during the grabbing movement with gripper fingers in the maximally open position and grips the data carrier cassette by movement of the gripper fingers into the closed position.

16. Archiving system for data carriers as defined in claim 15, characterized in that the gripper means has a stationary gripper finger and that the gripper means engages with this stationary gripper finger over the flat side of the data carrier cassette to be overlapped in space relation thereto during the grabbing movement and during the movement of the movable gripper finger into the closed position lays the stationary gripper finger against the flat side.

17. Archiving system for data carriers as defined in claim 15, characterized in that in the case of data carrier cassettes having a maximum width the gripper means engages abuttingly on the flat side to be overlapped with the stationary gripper finger during the grabbing movement and moves the movable gripper finger after the grabbing movement from the maximally open position into the closed position and thereby presses the data carrier cassette against the stationary gripper finger.

18. Archiving system for data carriers as defined in claim 1, characterized in that the gripper fingers are rotatable into two end positions turned through 180° relative to one another.

19. Archiving system for data carriers as defined in claim 1, characterized in that the gripper fingers are rotatable between an end position and a position turned through 90° in relation thereto.

20. Archiving system for data carriers as defined in claim 19, characterized in that the position turned through 90° in relation to the end position is an intermediate position.

21. Archiving system for data carriers as defined in claim 20, characterized in that the intermediate position is definable by a movable stop element.

22. Archiving system for data carriers as defined in claim 1, characterized in that the storage units are designed such that a front side of all the types of data carrier cassettes is located in a plane having the same distance from the track when the handling device is in access position.

23. Archiving system for data carriers as defined in claim 1, characterized in that the storage unit for disk cassettes as data carriers has a plurality of storage compartments arranged in stacks above one another and accommodating the disk cassettes in an essentially horizontal alignment.

24. Archiving system for data carriers as defined in claim 23, characterized in that the storage compartments have supports for the disk cassettes, and that the supports have a recess for one of the gripper fingers, said recess extending from an access side in access direction and contrary to a removal direction.

25. Archiving system for data carriers as defined in claim 24, characterized in that the supports comprise two ledges supporting the disk cassettes on opposite sides at their edges.

26. Archiving system for data carriers as defined in claim 23, characterized in that the storage compartments are provided with a holding element securing the disk cassette from falling out.

27. Archiving system for data carriers as defined in claim 26, characterized in that the holding element is arranged on the supports.

28. Archiving system for data carriers as defined in claim 26, characterized in that the holding element engages in a recess of the disk cassette.

29. Archiving system for data carriers as defined in claim 23, characterized in that the storage compartments have a rear-side stop for the disk cassettes.

30. Archiving system for data carriers as defined in claim 23, characterized in that the storage compartments are formed by supports for the disk cassettes arranged at a constant distance above one another.

31. Archiving system for data carriers as defined in claim 30, characterized in that a distance between the supports corresponds at least to the thickness or height of the disk cassette plus the height of the holding element.

32. Archiving system for data carriers as defined in claim 1, characterized in that the data carrier cassettes are provided on an end face with an identification.

33. Archiving system for data carriers as defined in claim 32, characterized in that a disk cassette is provided with two identifications on the same end face.

34. Archiving system for data carriers comprising a storage facility having storage locations for data carriers which includes:

a first storage unit for storing a first type of data carrier cassettes, and a second storage unit for storing a second type of data carrier cassettes, said first and second types of data carrier cassettes having a different thickness for gripping, a read/write facility having receiving means for the data carrier cassettes, said read-write facility including a first read/write unit for the first type of data carrier cassettes, and a second read/write unit for the second type of data carrier cassettes, and a handling device for transporting data carrier cassettes from the storage locations to the receiving means and vice versa, wherein said handling device includes a gripper means for the data carrier cassettes, said gripper means having gripper fingers adapted such that with the same gripper fingers both the first type as well as the second type of data carrier cassettes are transportable from their storage locations in the respective storage units to the receiving means of the respective first and second read/write unites and vice versa, and wherein said gripper fingers define therebetween a space which is adaptable to the thickness of the respective type of data carrier cassette prior to a gripping movement of said gripper fingers for gripping the respective data carrier cassette, and before the respective data carrier cassette enters said space.

35. Archiving system for data carriers as defined in claim 34, characterized in that the space is adaptable prior to a last grabbing movement of the gripper means towards the respective data carrier cassette.

* * * * *